(12) United States Patent
Schossmann et al.

(10) Patent No.: US 12,270,689 B2
(45) Date of Patent: Apr. 8, 2025

(54) POSITION SENSOR AND POSITION ENCODER USING MILLIMETER-WAVE METAMATERIAL WITH A MILLIMETER-WAVE RADAR

(71) Applicant: Infineon Technologies AG, Neubiberg (DE)

(72) Inventors: Alexander Schossmann, Graz (AT); Alexander Bergmann, Graz (AT); Dirk Hammerschmidt, Finkenstein (AT); Christof Michenthaler, Feistritz an der Gail (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 18/625,258

(22) Filed: Apr. 3, 2024

(65) Prior Publication Data
US 2024/0263973 A1    Aug. 8, 2024

Related U.S. Application Data

(62) Division of application No. 17/360,079, filed on Jun. 28, 2021, now Pat. No. 12,000,718.

(51) Int. Cl.
G01D 5/48    (2006.01)
G01P 3/00    (2006.01)

(52) U.S. Cl.
CPC . *G01D 5/48* (2013.01); *G01P 3/00* (2013.01)

(58) Field of Classification Search
CPC ......... G01D 5/48; G01P 13/04; G01P 13/045; G01P 3/00; G01P 3/44
See application file for complete search history.

(56) References Cited

U.S. PATENT DOCUMENTS 9,648,399 B2    5/2017  Witschnig et al.
10,399,393 B1   9/2019  Trotta
(Continued)

OTHER PUBLICATIONS

Fedotov V.A., et al., "Sharp Dark-mode Resonances in Planar Metamaterials With Broken Structural Symmetry," Feb. 2008, 4 pages. Retrieved from the Internet:[URL:https://arxiv.org/pdf/0704.1577.pdf].

(Continued)

*Primary Examiner* — Timothy X Pham
(74) *Attorney, Agent, or Firm* — Harrity & Harrity, LLP

(57) ABSTRACT

A rotation sensor system includes a rotatable target object configured to rotate about a rotational axis in a rotation direction; a first millimeter-wave (mm-wave) metamaterial track coupled to the rotatable target object, where the first mm-wave metamaterial track is arranged around the rotational axis, and where the first mm-wave metamaterial track includes a first array of elementary structures having at least one first characteristic that changes around a perimeter of the first mm-wave metamaterial track; at least one transmitter configured to transmit a first electro-magnetic transmit signal towards the first mm-wave metamaterial track, where the first mm-wave metamaterial track converts the first electro-magnetic transmit signal into a first electro-magnetic receive signal; at least one receiver configured to receive the first electro-magnetic receive signal; and at least one processor configured to determine a rotational parameter of the rotatable target object based on the received first electro-magnetic receive signal.

19 Claims, 16 Drawing Sheets

(56) References Cited

U.S. PATENT DOCUMENTS

| | | |
|---|---|---|
| 10,581,175 B2 | 3/2020 | Driscoll et al. |
| 11,408,977 B2 | 8/2022 | Hammerschmidt |
| 2002/0189336 A1 | 12/2002 | McEwan |
| 2011/0175672 A1 | 7/2011 | Nguyen et al. |
| 2017/0222738 A1 | 8/2017 | Hammerschmidt et al. |
| 2017/0285163 A1 | 10/2017 | Rieke et al. |
| 2019/0376858 A1* | 12/2019 | Hammerschmidt ...... G01L 3/00 |
| 2020/0350662 A1 | 11/2020 | Holz et al. |
| 2021/0033703 A1 | 2/2021 | Hammerschmidt |
| 2022/0412779 A1 | 12/2022 | Schossmann et al. |

OTHER PUBLICATIONS

Lapline M., et al., "Structural Tunability in Metamaterials," Applied Physics Letters, Aug. 2009, vol. 95, pp. 084105. doi: 10.1063/1.3211920.

Zhao X., et al., "Integrating Microsystems With Metamaterials Towards Metadevices," Microsystems & Nanoengineering, Jan. 2019, vol. 5, 17 pages. doi: 10.1038/s41378-018-0042-1.

Zhao X., et al., "Voltage-tunable Dual-layer Terahertz Metamaterials," Microsystems Nanoengineering, Jul. 2016, 8 pages. doi:10.1038/micronano.2016.25.

* cited by examiner

POSITION SENSOR AND POSITION ENCODER USING MILLIMETER-WAVE METAMATERIAL WITH A MILLIMETER-WAVE RADAR

RELATED APPLICATION

This application is a divisional of U.S. patent application Ser. No. 17/360,079, filed Jun. 28, 2021, which is incorporated herein by reference in its entirety.

FIELD

The present disclosure relates generally to a position sensing system and to methods for sensing a position, including angular or linear positions, of a target object.

BACKGROUND

Vehicles feature numerous safety, body, and powertrain applications that rely on speed sensing, position sensing, and/or angle sensing. For example, in a vehicle's Electronic Stability Program (EPS), magnetic angle sensors and linear Hall sensors can be used to measure steering angle and steering torque. Modern powertrain systems can rely on magnetic speed sensors for camshaft, crankshaft and transmission applications, along with automotive pressure sensors, to achieve required $CO_2$ targets and smart powertrain solutions. However, a disadvantage of known solutions is that they are sensitive to magnetic disturbances.

Magnetic disturbance fields are prevalent in vehicles such that magnetic angle-measurements often have to endure harsh environments. This is especially problematic in hybrid and electric vehicles, where many wires with high currents are located near the sensor system. Thus, external magnetic disturbance fields may be generated by current-rails in a vehicle that influence the accuracy of the magnetic angle measurements. Thus, an angle position sensor or a linear position sensor that is robust against electromagnetic stray fields may be desirable.

SUMMARY

One or more embodiments provide a rotation sensor system including a rotatable target object configured to rotate about a rotational axis in a rotation direction; a first millimeter-wave (mm-wave) metamaterial track coupled to the rotatable target object, wherein the first mm-wave metamaterial track is arranged around the rotational axis, and wherein the first mm-wave metamaterial track includes a first array of Fano resonance elementary structures having at least one first characteristic that changes around a perimeter of the first mm-wave metamaterial track; a first transmitter configured to transmit a first electro-magnetic transmit signal towards the first mm-wave metamaterial track, wherein the first mm-wave metamaterial track converts the first electro-magnetic transmit signal into a first electro-magnetic receive signal; at least one receiver configured to receive the first electro-magnetic receive signal; and at least one processor configured to determine a rotational parameter of the rotatable target object based on the first electro-magnetic receive signal.

One or more embodiments provide a rotation sensor system including: a rotatable target object configured to rotate about a rotational axis in a rotation direction; a first millimeter-wave (mm-wave) metamaterial track coupled to the rotatable target object, wherein the first mm-wave metamaterial track is arranged around the rotational axis, and wherein the first mm-wave metamaterial track includes a first array of elementary structures having at least one first characteristic that changes around a perimeter of the first mm-wave metamaterial track; a second mm-wave metamaterial track coupled to the rotatable target object, wherein the second mm-wave metamaterial track is arranged around the rotational axis, and wherein the second mm-wave metamaterial track includes a second array of elementary structures having at least one second characteristic that changes around a perimeter of the second mm-wave metamaterial track; and a third mm-wave metamaterial track coupled to the rotatable target object, wherein the third mm-wave metamaterial track is arranged around the rotational axis, and wherein the third mm-wave metamaterial track includes a third array of elementary structures having at least one third characteristic that changes around a perimeter of the third mm-wave metamaterial track.

One or more embodiments provide a method of determining at least one rotational parameter of a rotatable target object, the method including: transmitting a first electro-magnetic transmit signal towards a first millimeter-wave (mm-wave) metamaterial track of Fano resonance elementary structures, the first mm-wave metamaterial track being coupled to the rotatable target object, wherein the first mm-wave metamaterial track is arranged in a closed loop around a rotational axis about which the rotatable target object rotates; converting, by the first mm-wave metamaterial track, the first electro-magnetic transmit signal into a first electro-magnetic receive signal; receiving the first electro-magnetic receive signal; and evaluating the received first electro-magnetic receive signal; and determining a rotational parameter of the rotatable target object based on the evaluated first electro-magnetic receive signal.

One or more embodiments provide a method of determining at least one rotational parameter of a rotatable target object, the method including: transmitting a first electro-magnetic transmit signal towards a first millimeter-wave (mm-wave) metamaterial track, the first mm-wave metamaterial track being coupled to the rotatable target object, wherein the first mm-wave metamaterial track is arranged in a closed loop around a rotational axis about which the rotatable target object rotates; transmitting a second electro-magnetic transmit signal towards a second mm-wave metamaterial track, the second mm-wave metamaterial track being coupled to the rotatable target object, wherein the second mm-wave metamaterial track is arranged in a closed loop around the rotational axis; transmitting a third electro-magnetic transmit signal towards a third mm-wave metamaterial track, the third mm-wave metamaterial track being coupled to the rotatable target object, wherein the third mm-wave metamaterial track is arranged in a closed loop around the rotational axis; converting, by the first mm-wave metamaterial track, the first electro-magnetic transmit signal into a first electro-magnetic receive signal; converting, by the second mm-wave metamaterial track, the second electro-magnetic transmit signal into a second electro-magnetic receive signal; converting, by the third mm-wave metamaterial track, the third electro-magnetic transmit signal into a third electro-magnetic receive signal; evaluating, by at least one processor, the first, the second, and the third electro-magnetic receive signals; determining, by the at least one processor, a rotational speed of the rotatable target object based on the first electro-magnetic receive signal; determining, by the at least one processor, a rotational direction of the rotatable target object based on the first and the second electro-magnetic receive signals; and determining, by the at least one processor, an absolute angular position of the rotatable target object based on the third electro-magnetic receive signal.

One or more embodiments provide a linear position sensor system, including: a linear movable target object configured to move linearly in a linear moving direction; a first millimeter-wave (mm-wave) metamaterial track coupled to the linear movable target object, wherein the first mm-wave metamaterial track extends lengthwise parallel to the linear moving direction, and wherein the first mm-wave metamaterial track includes a first array of elementary structures having at least one first characteristic that changes along the first mm-wave metamaterial track in the linear moving direction; a second mm-wave metamaterial track coupled to the linear movable target object, wherein the second mm-wave metamaterial track extends lengthwise parallel to the linear moving direction, and wherein the second mm-wave metamaterial track includes a second array of elementary structures having at least one second characteristic that changes along a length of the second mm-wave metamaterial track parallel to the linear moving direction; a third mm-wave metamaterial track coupled to the linear movable target object, wherein the third mm-wave metamaterial track extends lengthwise parallel to the linear moving direction, and wherein the third mm-wave metamaterial track includes a third array of elementary structures having at least one third characteristic that changes along a length of the third mm-wave metamaterial track; at least one transmitter configured to transmit a first electro-magnetic transmit signal towards the first mm-wave metamaterial track, a second electro-magnetic transmit signal towards the second mm-wave metamaterial track, and a third electro-magnetic transmit signal towards the third mm-wave metamaterial track, wherein the first mm-wave metamaterial track converts the first electro-magnetic transmit signal into a first electro-magnetic receive signal, wherein the second mm-wave metamaterial track converts the second electro-magnetic transmit signal into a second electro-magnetic receive signal, and wherein the third mm-wave metamaterial track converts the third electro-magnetic transmit signal into a third electro-magnetic receive signal; at least one receiver configured to receive the first, the second, and the third electro-magnetic receive signals; and at least one processor configured to determine a linear speed, a movement direction, and an absolute linear position, of the linear movable target object based on the first, the second, and the third electro-magnetic receive signals.

BRIEF DESCRIPTION OF THE DRAWINGS

Embodiments are described herein making reference to the appended drawings.

DETAILED DESCRIPTION

Figure 1A:
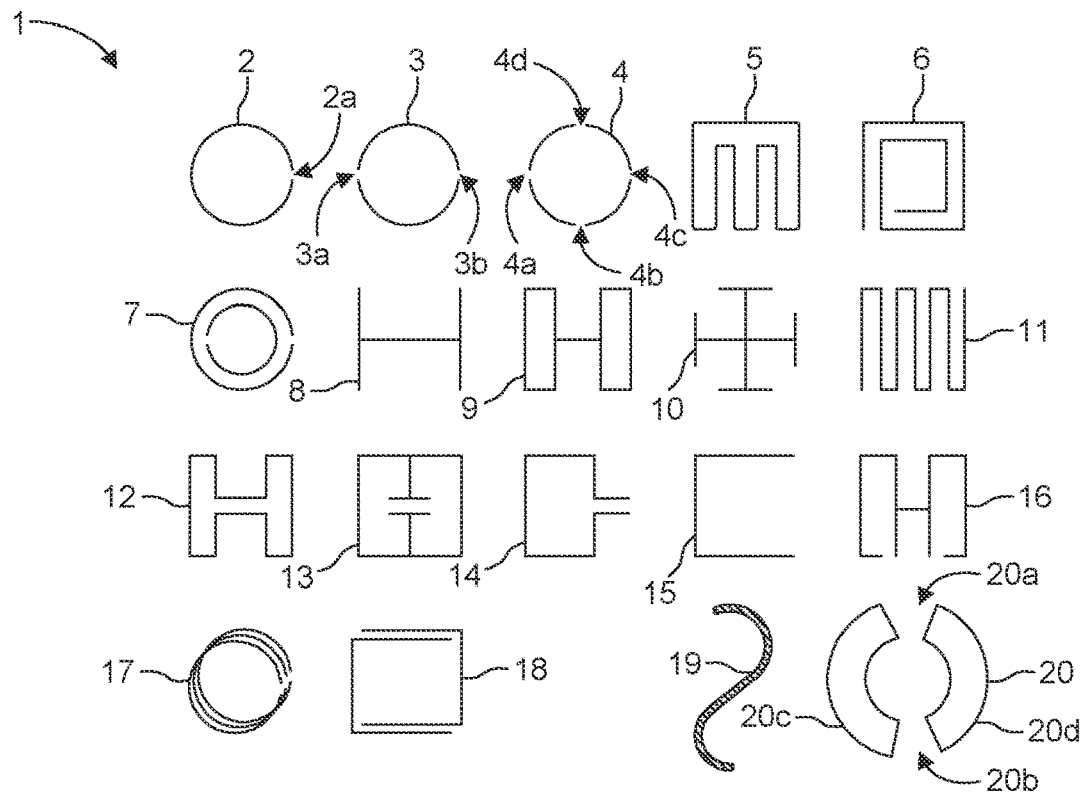
FIG. 1A illustrates a plurality of possible elementary structures according to one or more embodiments.

In the following, various embodiments will be described in detail referring to the attached drawings. These embodiments are given for illustrative purposes only and are not to be construed as limiting. For example, while embodiments may be described as comprising a plurality of features or elements, in other embodiments, some of these features or elements may be omitted, and/or may be replaced by alternative features or elements. In other embodiments, further features or elements in addition to those explicitly shown or described may be provided. In addition, features of the different embodiments described hereinafter may be combined with each other to form further embodiments, unless specifically noted otherwise. For example, variations or modifications described with respect to one of the embodiments may also be applicable to other embodiments unless noted to the contrary.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. Functional blocks may be implemented in hardware, firmware, software, or a combination thereof.

Embodiments relate to sensors and sensor systems, and to obtaining information about sensors and sensor systems. A sensor may refer to a component which converts a physical quantity to be measured to an electric signal, for example, a current signal or a voltage signal. In general, a physical quantity may for example comprise a magnetic field, an electric field, radio waves, a pressure, a force, a current or a voltage, but is not limited thereto. A sensor device, as described herein, may be an angle sensor, a linear position sensor, a speed sensor, a motion sensor, and the like.

The sensor circuit may be referred to as a signal processing circuit and/or a signal conditioning circuit that receives one or more signals (i.e., sensor signals) from one or more sensor elements in the form of raw measurement data and derives, from the sensor signal, a measurement signal that represents the physical quantity.

It will be appreciated that the terms "sensor", "sensor element", and "sensing element" may be used interchangeably throughout this description, and the terms "sensor signal" and "measurement signal" may also be used interchangeably throughout this description.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal. Therefore, the sensor package may include a circuit that conditions and amplifies the small signal of the sensor element via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Embodiments are discussed below in the context of a millimeter wave (mm-wave) sensor and mm-wave systems that include a mm-wave transmitter, a mm-wave receiver, and/or a mm-wave transceiver. Mm-waves are radio waves designated in the band of radio frequencies in the electromagnetic spectrum from 30 to 300 gigahertz (GHz) and may also be used as radar waves. Thus, a mm-wave sensor, system, transmitter, receiver, or transceiver described herein may also be regarded to as a radar sensor, system, transmitter, receiver, or transceiver, and a mm-wave may be regarded to as a radar signal. It should be noted, however, that the embodiments may also be applied in applications different from radar such as, for example, radio frequency (RF) transmitters, receivers, or transceivers of RF communication devices. In fact, any RF circuitry may take advantage of the concepts described herein. A mm-wave sensor or mm-wave system may be configured as an angle sensor, a linear position sensor, a speed sensor, a motion sensor, a torque sensor, and the like.

A metamaterial is a material engineered to have a property that is not found in naturally occurring materials. They are made from assemblies of multiple structural elements fashioned from composite materials such as metals or plastics. The materials may be arranged in repeating or periodic patterns, at scales that are smaller than the wavelengths of the phenomena they influence. In other words, metamaterials attain the desired effects by incorporating structural elements of sub-wavelength sizes, i.e., features which are actually smaller than the wavelength of the electromagnetic waves that they affect.

As a result, metamaterials derive their properties not necessarily from the properties of the base materials, but from their designed structures. Their precise shape, geometry, size, orientation, and arrangement of the structural elements gives the metamaterials their smart properties capable of manipulating electromagnetic waves: by blocking, reflecting, absorbing, enhancing, or bending waves, to achieve benefits. Thus, a metamaterial is defined as an artificial composite that gains its electrical properties from its exactingly-designed structures and their arrangement rather than inheriting them directly from which the materials it is composed.

A metamaterial may be a subset of a larger group of heterogeneous structures consisting of a base solid material and elements of a different material. The distinction of metamaterials is that they have special, sometimes anomalous, properties over a limited frequency band. For example, mm-wave metamaterials may exhibit special properties over a millimeter band, which is the band of spectrum between 30 GHz and 300 GHz noted above.

In the context of the described embodiments, a metamaterial is a two-dimensional (2D) or three-dimensional (3D) array of elementary structures, which are coupled to each other. "Elementary structures," as used herein, may be referred to as discrete structures, element structures, or a combination thereof. In some cases, the elementary structures may be referred to simply as "structures."

The overall array provides macroscopic properties, which can be designed by the used elementary structures and their coupling paths. Metamaterials are configured for different kind of waves like electromagnetic waves (e.g., optical, infrared (IR), and mm-waves) and mechanical waves (e.g., ultrasonic). The scale of the elementary structures and their grid pitch scale with the wavelength of the target frequency range.

Elementary structures in mm-wave metamaterials may include resonator-elements, antenna-elements, filter-elements, waveguide-elements, transmission line elements, or a combination of those shown in FIG. 1A. The elementary structure size may range up to several wavelengths but is typically less than one wavelength. They consist of parts that generate magnetic fields (e.g., conductor rings) and other parts that create electrical fields (e.g., gaps between conductors). Furthermore, they also may have elements that have electromagnetic wave properties, such as a short transmission line segment.

In general, those elementary structures electrically represent resistive-inductive-capacitive (RLC) networks. In the frequency range where they will be used in the meta material, the characteristic of their resistive, inductive, and capacitive parameters is distributed over the geometry. Since filters, resonators, transmission lines, and antennas can be differently parametrized representatives of identical structures it is often not unambiguously possible to assign a structure to a single group. Thus, it is to be understood that a structure described as resonator can also be seen as antenna or a filter depending on its use or implementation details. Furthermore, the behavior may also change with the frequency where it is operated and a structure that behaves as transmission line for one frequency may also expose a filter characteristic or create a resonance at another frequency of operation. Finally, the choice of the material impacts the behavior which means that a choice of a better conductor will emphasize a resonant behavior while a less conductive material will increase the damping and make a filter characteristic dominant.

FIG. 1A illustrates a plurality of possible elementary structures according to one or more embodiments. The elementary structures 1 include a split ring resonator 2 having one capacitor coupling 2a, a split ring resonator 3 having two capacitor couplings 3a and 3b, a split ring resonator 4 having four capacitor couplings 4a-4d, antenna structure 5, an antenna coil 6, a nested split ring resonator 7, antenna structure 8, antenna structure 9, antenna structure 10, transmission line structure 11, antenna structure 12, coupled split ring resonators 13, split ring resonator 14, partial ring or coupling structure 15, and coupled split ring resonator 16.

The transmission line structure 11 may be a damping structure or delay structure. It may be used in an alternating configuration with resonators in order to establish an attenuated or phase shifted coupling between them instead of coupling directly. Coupling to the resonators can be capacitive or galvanic. It may also extend onto a second layer, for example, with an identical structure creating a real transmission line (i.e., two parallel wires).

The partial ring or coupling structure 15 may be referred to as a partial ring structure in the context of it being half of a split ring resonator 18. In this context, the partial ring structure 15 is coupled to a second layer to form a resonator. The partial ring or coupling structure 15 may also be used as a coupling structure as in the example in FIG. 6B. In this context, it provides capacitive coupling between ring resonator elements, but will not resonate remarkably (at least at the low frequency) as the coupled split ring resonators.

Furthermore, the elementary structures can be three-dimensional as well, such as spiral coils and nested split ring resonators that are oriented into all three Cartesian coordinate directions. Furthermore, three-dimensional structures can be generated by layering two-dimensional elementary structures in a stacked arrangement. For example, two elementary structures may be layered over one another in a vertical dimension so that they overlap with each other. In this way, a vertical capacitive coupling may be achieved between the two elementary structures and may be adjusted by varying an amount of overlap in a horizontal dimension.

FIG. 1A further illustrates a stacked split ring resonator structure 17 having three split ring resonators stacked on top of each other. The stacked split ring resonator structure 17 may be formed by using three metallization layers stacked on top of each other. FIG. 1A further illustrates a split ring resonator 18 made of two half-ring structures 15 that overlap such that a vertical capacitive coupling exists between the two half-ring structures. By varying the amount of overlap, the loop size can be made larger (e.g., by decreasing the amount of overlap) or smaller (e.g., by increasing the amount of overlap), which in turn results in a lower vertical capacitive coupling or a higher vertical capacitive coupling, respectively.

FIG. 1A further illustrates an "S" shaped elementary structure 19 and an asymmetric split ring elementary structure 20 having two capacitor couplings 20a and 20b. The capacitive couplings are formed between two arc structures 20c and 20d of the asymmetric split ring elementary structure 20. In particular, the two arc structures 20c and 20d are separated by two gaps (20a and 20b) through which the capacitive coupling occurs. The, respective ends of the two arc structures 20c and 20d are separated from each other by respective gaps 20a and 20b.

Figure 1B:
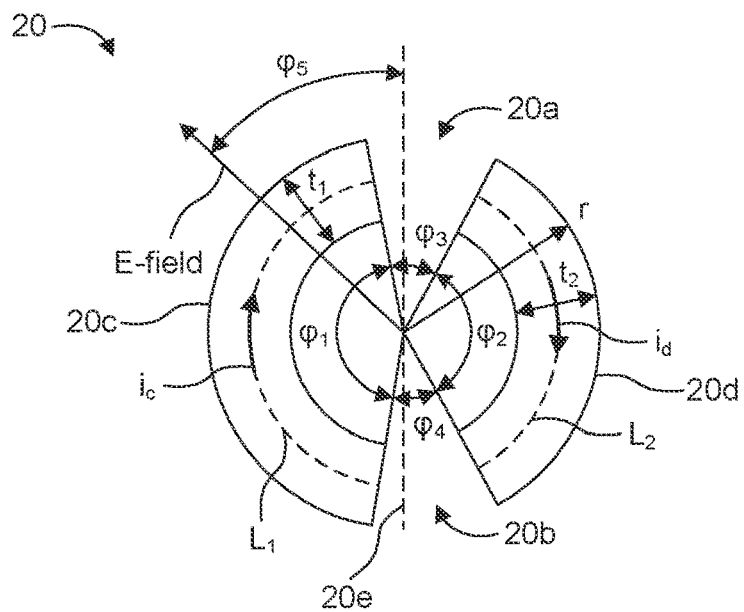
FIG. 1B is a plan view of an asymmetric split ring elementary structure according to one or more embodiments.

FIG. 1B is a plan view of an asymmetric split ring elementary structure 20 according to one or more embodiments. The asymmetric split ring elementary structure 20 is asymmetric about a planar axis 20e and includes two arc structures 20c and 20d that are split from each other by two gaps 20a and 20b. In other words, the two arc structures 20c and 20d are completely separated from each other. Here, the two arc structures 20c and 20d also have a same (in-plane) inner radius and a same (in-plane) outer radius r, meaning their radial thicknesses t1 and t2 are equal.

In addition, each arc structure 20c and 20d has a median circumferential length L1 and L2, respectively. The median circumferential length is an average between an outer circumferential length and an inner circumferential length of the arc structure. In this example, the outer circumferential lengths of the arc structures 20c and 20d are equal, as are their inner circumferential lengths.

The angular measure $\varphi 3$ and $\varphi 4$ of the gaps 20a and 20b may be equal, meaning that, due to the asymmetry, the angular measure $\varphi 1$ and $\varphi 2$ are different and further meaning that the median circumferential lengths L1 and L2 are different. Alternatively, the angular measure $\varphi 3$ and $\varphi 4$ of the gaps 20a and 20b may be unequal, meaning that, due to the asymmetry, the angular measure $\varphi 1$ and $\varphi 2$ can be the same and further meaning that the median circumferential lengths L1 and L2 can be the same.

In either case, the asymmetric split ring elementary structure 20 is asymmetric about a planar axis 20c (i.e., the asymmetry axis). The transmission and reflection by an elementary structure are strongly dependent on the orientation of the metamaterial with respect to the polarization of the incident mm-waves. As a result of its asymmetry, the asymmetric split ring elementary structure 20 exhibits a sharper resonance in response to a linearly polarization of incident mm-waves than symmetric elementary structures. This sharp resonance of the asymmetric split ring elementary structure 20 decreases strongly with increasing angle 45 between the electrical field vector and the planar axis 20c of the elementary structure. Thus, the working frequency of asymmetric split ring elementary structure 20 can be tuned according to its asymmetry.

It is noted that due to an asymmetric characteristic of the asymmetric split ring elementary structure 20 (e.g., unequally sized gaps 20a and 20b or unequally sized separated structures 20c and 20d), the asymmetric elementary structure 20 has a Fano resonance. Entirely separated structures have different modes with corresponding current distributions that result in a a Fano resonance being produced by the elementary structure. In some cases, the separated structures have separate resonances that produce the Fano resonance.

For example, arc structure 20c has a first current distribution and arc structure 20d has a second current distribution which flows in phase opposition to the first current distribution. Their electromagnetic fields produced by the current distributions partly cancel each other out resulting in a weak coupling to free space. This mode corresponds to a Fano resonance. In a Fano resonance elementary structure, current flows in both separated structures 20c and 20d in a same rotation direction (clockwise or counterclockwise) for the complete elementary structure. Here, current ic in arc structure 20c and current id in arc structure 20d are both flowing clockwise. Meta material with elementary structures observing a Fano resonance are generally characterized by the asymmetric shape of the resonance observed in a spectral diagram and a rapid variation of the phase around the resonance allowing a sharper resonance effect and increased resolution of the position or angle. A symmetric elementary structure, such as elementary structures 2, 3, 7, 17, and 18 cannot produce a Fano resonance for at least linearly polarized incident waves. For example, symmetric elementary structurers with separated structures do not produce a Fano residence, in part, because the currents in the separated structures flow in opposite rotation directions.

In order to achieve a quasi-homogeneous macroscopic behavior, the elementary structures are arranged in arrays which typically have dimensions that are larger than a wavelength of the target frequency range and include a multitude of elementary structures in each utilized direction.

Figure 2A:
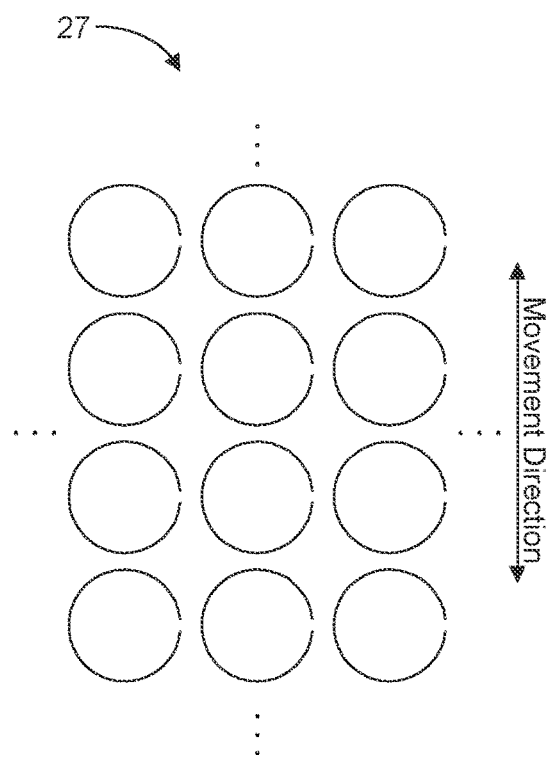
FIGS. 2A-2C illustrate a segment of a mm-wave metamaterial track according to one or more embodiments.
Figure 2B:
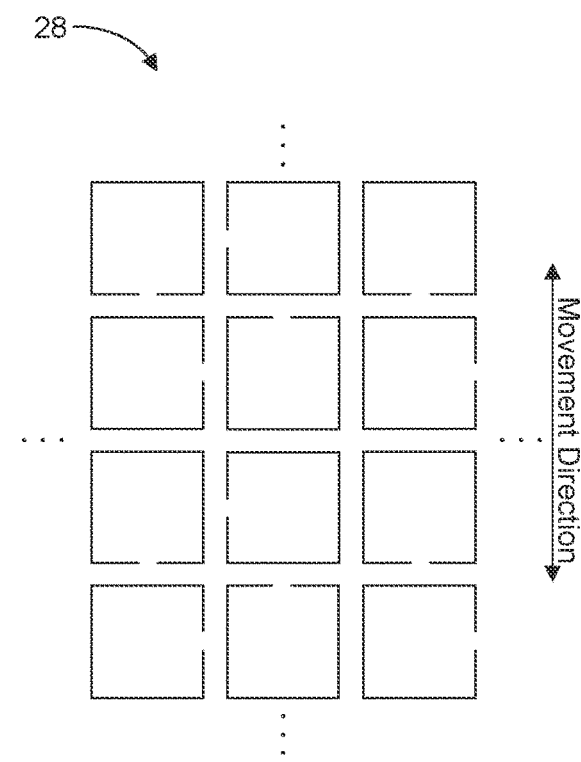
Figure 2C:
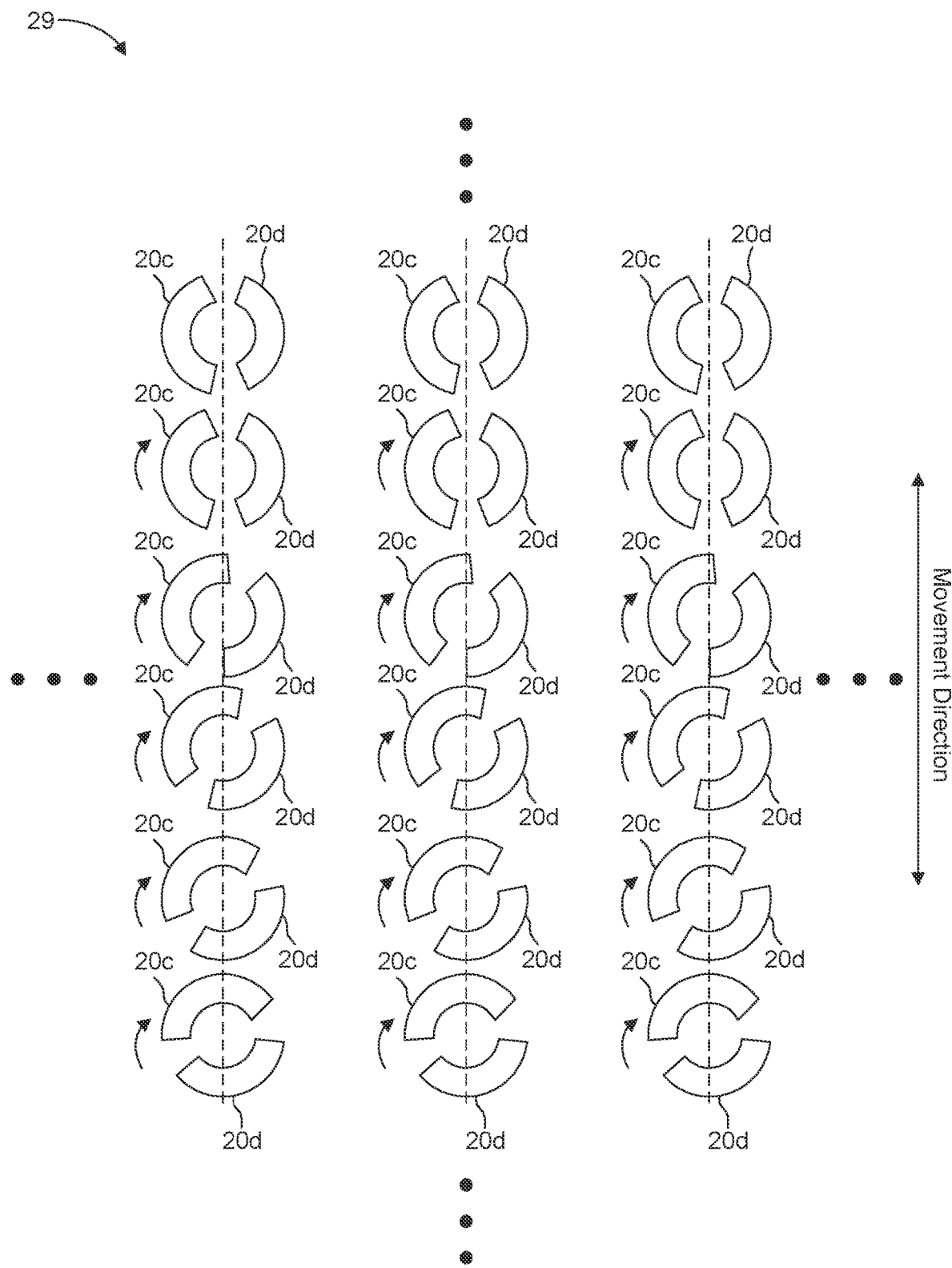

FIGS. 2A-2C illustrate a segment of a mm-wave metamaterial track according to one or more embodiments. A mm-wave metamaterial track is a stripe of mm-wave metamaterial that has multiple elementary structures arranged in both widthwise and lengthwise dimensions. The mm-wave metamaterial track may be circumferentially arranged about a rotation axis (i.e., separated from but concentric with the rotation axis) of a rotating object or may be lineally arranged on a linearly moving object, aligned parallel to the movement direction of linear movement. A movement direction may be a rotational direction or a linear direction and may be unidirectional or bidirectional.

Specifically, FIG. 2A shows an example of a 2D metamaterial array 27 of symmetric split ring resonators, which are expected to extend further in both horizontal and rotational (circumferential) directions. However, it will be appreciated that the split ring resonators may be exchanged with any type of elementary structure, for example, with any of those shown in FIG. 1A. Each split ring resonator comprises an open ring that represents an inductivity (L) and a gap or opening that provides a capacitive coupling (C). Thus, each split ring resonator is a type of LC resonator.

There exists a mutual coupling of the structures in the array 27, which can be a capacitive coupling, an inductive coupling, or both. In this case, both types of coupling is present. For example, capacitive coupling between structures exists in the vertical direction (i.e., along the rotation direction) on the sides where rings are close together. In addition, inductive coupling between structures is provided by the field generated by each split ring resonator.

Thus, electrically, the arrangement of the elementary structures in an array introduces a mutual coupling between the elementary structures, wherein the coupling effect may utilize electric field (capacitive near field coupling), magnetic field (inductive near field coupling), waveguide coupling, or electromagnetic waves (far field coupling). Due to the dimensions of the arrays and depending on the type of used elementary structures, the coupling effect will typically made up of a mixture of all mechanisms.

The manner in which the structures are coupled affects the coupling behavior of the array or a portion of that array. In turn, this change in coupling behavior impacts an effect the individual structures or a group of structures have on a transmission wave or signal incident on that structure or that group of structures.

Furthermore, the coupling effect between structures is different if gaps or openings of neighboring structures are face-to-face or if the gaps face (i.e., are adjacent to) a closed segment of a neighboring structure. For example, FIG. 2B shows an example of 2D array 28 of split ring resonators an orientation of the split ring resonators changes in both the horizontal (width) and vertical (length) directions of the array 28 (i.e., of the metamaterial track). In other words, the location of the gap of each split ring resonator varies across neighboring structures. As a result, the coupling effect between structures is different than the coupling effect produced by the structures shown in FIG. 2A. The different shapes (circular versus rectangular) may also impact the characteristic of the structure itself and the coupling effect.

Each elementary structure has a size (e.g., a width or diameter) of 10% to 100% of the wavelength of a transmitted mm-wave to which the structure is sensitive. The array 27 may be a single metallization layer disposed or printed on a film such that the array 27 is two-dimensional. As noted above, it may also be possible to stack multiple metallization layers to form a 3D array.

Thus, arrays 27 and 28 include multiple repetitions of element structures having differing arrangements with respect to each other that induce a different property on a transmission wave or signal incident thereon due to the change in coupling effect between the structures.

Similarly, FIG. 2C shows an example of a 2D metamaterial array 29 of asymmetric split ring resonators 20, which are expected to extend further in both horizontal and rotational (circumferential) directions. The 2D metamaterial array 29 or metamaterial track has a metamaterial pattern that is designed in a way that at least one property of the element structures changes with the displacement along a given direction (e.g., along the rotation (circumferential) direction).

Here, the element structures are arranged in a way that their radial orientation (i.e., an orientation with respect to the radial vector) incrementally changes along the movement direction. The orientation rotationally shifts (e.g., clockwise) for each subsequent row of element structures. Specifically, the element structures are arranged in a way that their orientation in an illuminated segment of an mm-wave changes with the movement of the metamaterial track (e.g., with the rotation thereof). Thus, it can be said that the pattern of the elementary structures changes continuously or gradually at discrete increments along the metamaterial track.

At least one segment of the metamaterial array is illuminated by at least one mm-wave transmitter. In this way, the transmission and reflection signals from the illuminated segment of the metamaterial track are periodically modulated with the movement of the metamaterial track (e.g., with the rotation thereof). Therefore, it is possible to realize a contactless sine encoder.

For example, the movement direction may be a rotational direction and the metamaterial pattern may incrementally change along the rotational direction such that the pattern repeats once over 360° of the metamaterial track. In other words, a single period of characteristic change in the metamaterial pattern is encoded around the perimeter of the second mm-wave metamaterial track.

In this case, the sinusoidal transmission or reflection signal may be generated by the illuminated segment of the metamaterial track as the metamaterial track rotates in the rotational direction. That is, the metamaterial pattern may be designed to encode one period of sinus modulation along one rotation of the metamaterial track. Because one period is encoded onto the metamaterial pattern, each row of element structures uniquely corresponds to a discrete position (e.g., an angle of rotation or a measure of linear displacement). Said differently, different illuminated segments arranged along the movement direction of the metamaterial track produce a different transmission or reflection signal in either amplitude and/or phase when illuminated by a mm-wave. The position of the illuminated segment is unique to the absolute position of the metamaterial track. Thus, the transmission or reflection signal is also unique to the absolute position of the metamaterial track and oscillates as a sinusoidal signal as the metamaterial track moves with respect to a mm-wave transmitter. In the case of a rotational movement, the absolute position of the illuminated segment is unique to the rotation angle of the metamaterial track about a rotation axis and the transmission or reflection signal is also unique to the rotation angle of the metamaterial track about a rotation axis.

Alternatively, the metamaterial pattern may incrementally change along the rotational direction such that the pattern repeats multiple times over 360° of the metamaterial track. Here, it can be said that elementary structures have a 360°/N periodical pattern that changes at discrete increments around the perimeter of the mm-wave metamaterial track, where N is an integer greater than one. In this case, the metamaterial pattern may be designed to encode multiple periods of sinus modulation along one rotation of the metamaterial track, thereby generating a higher resolution sinusoidal transmission or reflection signal when illuminated by a mm-wave.

As will become apparent in the following description, one or more mm-wave metamaterial tracks may be used to perform off-axis angle measurements pertaining to a rotatable target object or to perform linear position sensing pertaining to a linear movable target object.

Figure 3A:
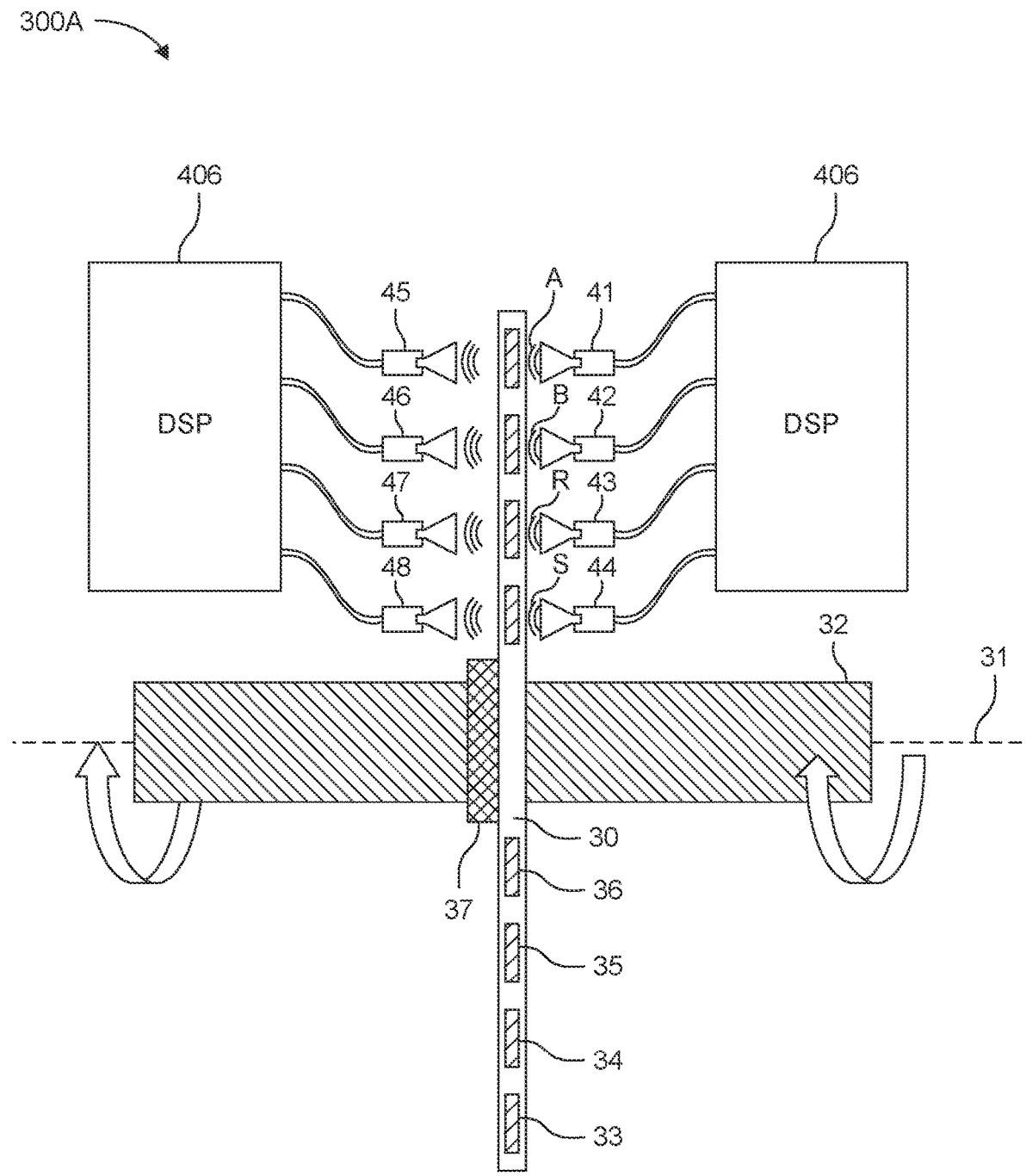
FIG. 3A is a cross-sectional view of a rotational sensor system according to one or more embodiments.
Figure 3B:
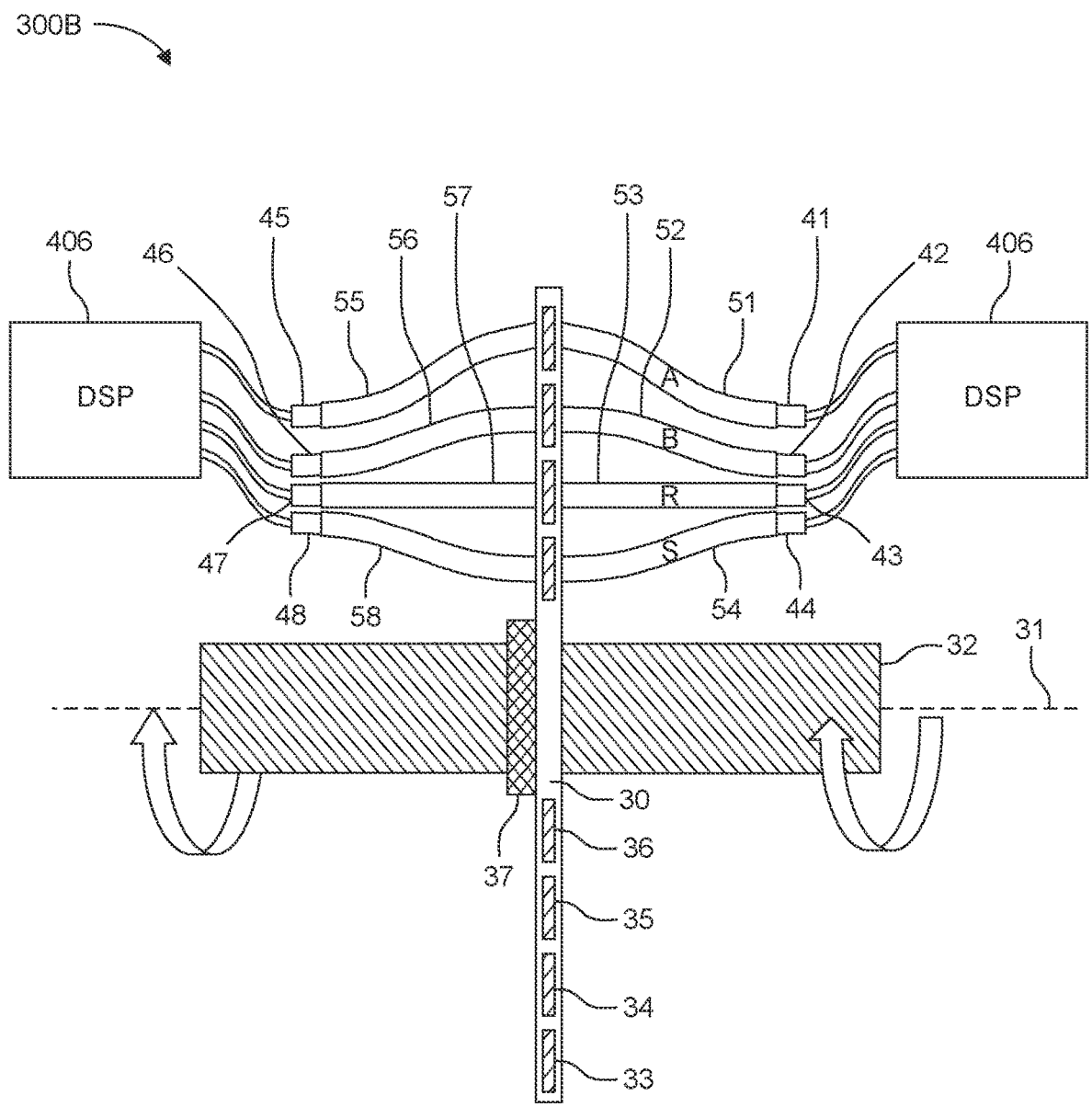
FIG. 3B is a cross-sectional view of another rotational sensor system according to one or more embodiments.

FIG. 3A is a cross-sectional view of a rotational sensor system 300A according to one or more embodiments. FIG. 3B is a cross-sectional view of a rotational sensor system 300B according to one or more embodiments. The two systems differ in the transmitting devices used to transmit mm-wave beams (i.e., an electro-magnetic transmit signals) at their respective mm-wave metamaterial tracks and the receiving devices used to receive mm-wave beams (i.e., an electro-magnetic receive signals) from their respective mm-wave metamaterial tracks.

The rotational sensor systems 300A and 330B may include any type of rotation or position sensor such as speed, absolute angle, incremental angle, torque, or a combination thereof. The systems 300A and 300B include a rotatable target object 30 configured to rotate about an axis of rotation 31 (i.e., a rotational axis) and the rotational sensor systems 300A and 300B are configured to measure at least one rotational parameter of the rotatable target object 30, such as rotational speed, rotational direction, and absolute angular position (e.g., in degrees). The rotatable target object 30 may be a disc or a wheel coupled by a coupling structure 37 to a shaft 32 that extends along the rotational axis 31. As the shaft 32 rotates, so does the rotatable target object 30. The rotatable target object 30 represents a mechanical target for one or more mm-wave beams.

The rotatable target object 30 includes four mm-wave metamaterial tracks 33-36 that each form a respective closed loop around the shaft 32. In this example, the four mm-wave metamaterial tracks 33-36 are concentric loops located at different distances from the rotational axis 31. In some embodiments, it may be possible to use a single closed-loop metamaterial track or more than four closed-loop metamaterial tracks. The mm-wave metamaterial tracks 33-36 are fixed to the rotatable target object 30 such that they co-rotate with the rotatable target object 30 as it rotates.

It may also be possible to use tracks with different characteristic variations of the patterns, for example, implementing a sine function or a cosine function in the varying characteristic of the metamaterial. Furthermore, reference tracks that do not change the characteristic of the metamaterial may be of interest to characterize the influence of environmental influences or setup parameters like the distance between the antenna and the meta material stripe or the temperature and humidity of the ambient environment. Multiple reference stripes with different metamaterial setups may be used to deliver different reference measurements. For example, different reference stripes may be used to provide for a minimum and a maximum of the variation of metamaterial properties.

Rotational sensor system 300A uses transceivers 41-44 and/or transceivers 45-48 each with antenna placed sufficiently close to their respective mm-wave metamaterial tracks to achieve spatial differentiation between the transmit signals and the receive signals. As will be explained below, transceivers 41-44 may be implemented as transceivers to both transmit and receive mm-waves as electro-magnetic transmit and receive signal. Each transceiver includes a directional coupler in order to perform transmission and reception via a same antenna. Similarly, transceivers 45-48 may be implemented as transceivers to both transmit and receive electro-magnetic transmit and receive signal. In other cases, transceivers 41-44 may be implemented as transmitters and transceivers 45-48 may be implemented as receivers. Alternatively, the opposite may also be true, where transceivers 45-48 may be implemented as transmitters and transceivers 41-44 may be implemented as receivers. Any combination thereof is also possible. Thus, any transceiver may be simply a transmitter or a receiver depending on the configuration.

On order to achieve a homogeneous radiation on each metamaterial track, each antenna is focused on a different track. In this case, the transmitter antennas can be operated in parallel or by separate transmitters. Here, transceiver 41 is configured to transmit a first electro-magnetic transmit signal (e.g., a linearly polarized mm-wave beam) at mm-wave metamaterial track 33, transceiver 42 is configured to transmit a second electro-magnetic transmit signal (e.g., a linearly polarized mm-wave beam) at mm-wave metamaterial track 34, transceiver 43 is configured to transmit a third electro-magnetic transmit signal (e.g., a linearly polarized mm-wave beam) at mm-wave metamaterial track 35, and transceiver 44 is configured to transmit a fourth electro-magnetic transmit signal (e.g., a linearly polarized mm-wave beam) at mm-wave metamaterial track 36. The antenna of each transceiver 41-48 is arranged in proximity to (i.e., coupled to via a coupling effect) a respective metamaterial track 33-36 in order for the transceivers to achieve spatial differentiation between their transmit signals and ultimately between their receive signals A, B, R, and S as well.

Rotational sensor system 300B uses transceivers 41-44 and/or transceivers 45-48 each coupled to a respective waveguide 51-58. The waveguides 51-58 are used to direct electro-magnetic transmit and/or receive signals to/from their respective transceivers 41-48. This allows the antennas of the transceivers 41-48 to be placed further away from their mm-wave metamaterial track while still achieving spatial differentiation between signals A, B, R, and S.

When implemented as transceivers, each transceiver 41-44 is configured to receive a partially-reflected mm-wave (i.e., an electro-magnetic receive signal) from a corresponding metamaterial track of the four metamaterial tracks 33-36. In other words, the receiver antennas of the transceivers 41-44 are isolated from each other in a way that receiver antenna of transceiver 41 substantially receives a partially-reflected mm-wave only from one of the tracks (e.g., metamaterial track 33), receiver antenna of transceiver 42 substantially receives a reflected mm-wave only from the other one of the tracks (e.g., metamaterial track 34), receiver antenna of transceiver 43 substantially receives a reflected mm-wave only from the other one of the tracks (e.g., metamaterial track 35), and receiver antenna of transceiver 44 substantially receives a reflected mm-wave only from the other one of the tracks (e.g., metamaterial track 36). Thus, isolations between the antennas or between the tracks, such as a metal stripe, may be provided.

While a small portion of a non-corresponding reflected mm-wave may be received at each antenna, this signal may be attenuated to the extent that the signal can be ignored or filtered out as noise by the transceivers 41-44.

Regardless of the transmitter/receiver configuration, it will be understood that at least one transmitter and at least one receiver is implemented for transmitting and detecting mm-wave beams where different receiving antenna and receiving circuitry correspond to different closed-loop metamaterial track on a one-to-one basis. The transmitters and receivers may be electrically coupled to a system controller and/or a DSP.

The rotational sensor systems 300A and 300B may be configured to monitor a mm-wave that passes through the metamaterial tracks 33-36 instead of monitoring reflected mm-waves. As a result, a transmitter/receiver pair is used for each metamaterial track. For example, transmitter 41 may transmit an mm-beam at metamaterial track 33, which at least partially passes through metamaterial track 33 where it is received by receiver 44. In this case, transceiver 44, implemented as a receiver, is configured to receive a partially transmitted mm-wave (i.e., an electro-magnetic receive signal) as a result of the transmitted mm-wave interacting with (i.e., being partially absorbed by and transmitted through) the metamaterial track 33. Similarly, the receivers 46-48 may be configured to receive a partially transmitted mm-waves (i.e., an electro-magnetic receive signals) as a result of respective transmitted mm-waves interacting with (i.e., being partially absorbed by and transmitted through) respective metamaterial tracks 34-36.

It will also be appreciated that a combination of different receiver configurations may be realized. For example, one receiver may be arranged for detecting and measuring a partially-reflected mm-wave from one of the metamaterial tracks (i.e., metamaterial track 33) and another receiver may be arranged for detecting and measuring a partially-transmitted mm-wave that passes through the other one of the metamaterial tracks (i.e., metamaterial track 34). In addition, two receivers may be used for analyzing a same metamaterial track, where one detects and measures a partially-reflected mm-wave and the other detects and measures a partially-transmitted mm-wave. Accordingly, one or more metamaterial tracks may be configured with higher reflectivity and other metamaterial tracks may be configured with a higher absorptivity with respect to one another.

It will also be appreciated that a combination of FIGS. 3A and 3B may be realized with a mix of close transceivers, transmitters, and/or receivers, as in FIG. 3A, and waveguides with distant transceivers, transmitters, and/or receivers, as in FIG. 3B, being utilized.

Based on the embodiments shown in FIGS. 3A and 3B and combinations of transceivers, transmitters, and/or receivers, an electro-magnetic transmit signal is converted into an electro-magnetic receive signal by interacting with a metamaterial track. The interaction may include a reflection, an absorption, a transmission, or a combination thereof. Track 33 converts the first electro-magnetic transmit signal into an electro-magnetic receive signal (reflection signal A in FIGS. 3A and 3B), track 34 converts the second electro-magnetic transmit signal into an electro-magnetic receive signal (reflection signal B in FIGS. 3A and 3B), track 35 converts the second electro-magnetic transmit signal into an electro-magnetic receive signal (reflection signal R in FIGS. 3A and 3B), and track 36 converts the second electro-magnetic transmit signal into an electro-magnetic receive signal (reflection signal S in FIGS. 3A and 3B). As noted above, the receive signals can also be signals that have passed through the metamaterial tracks instead of being reflected.

Each receiver antenna is coupled to receiver circuitry configured to demodulate a receive signal in order to determine a characteristic of the receive signal. A rotational speed, rotational direction, and/or an absolute angular position of the rotatable target object 30 is then determined by the receiver circuit or a system controller utilizing a signal processor based on the determined characteristic of one or more receive signals received from one or more metamaterial track.

In particular, each metamaterial track is configured such that a characteristic or property of the metamaterial changes along the perimeter of the track. Thus, how the metamaterial interacts with a mm-wave changes along the perimeter of the track. For example, the elementary structures of an array may have a 360° periodical pattern that changes continuously around the circumference of the rotatable target and/or along the perimeter of the metamaterial track. Thus, the pattern continuously changes from 0° to 360° along the closed-loop of the metamaterial track, and then repeats.

In this case, a property and/or arrangement of the metamaterial is specific to an absolute angular position along the metamaterial track, and, thus, is also specific to an absolute angular position of the rotatable target object. An absolute angular position is an angular position relative to a predetermined (i.e., reference) angular position of the rotatable target object. For example, the reference angular position may be zero degrees, and an absolute angular position may be a specific position rotated from zero degrees over a 360° period. Thus, each absolute angular position has an absolute angular value from 0° to 360°.

For commutation of multi-pole electric motors with 3N poles, the electric angle being the sum of all poles has to be 360°. Thus, the periodical pattern of the elementary structures of an array for the mechanical angle may have a period of 360°/N, with N being an integer number. That is, the periodical pattern repeats every 360°/N. In this case, multiple predetermined (i.e., reference) angular positions of the rotatable target object may be known, and each absolute angular position has an absolute angular value from one of the reference angular positions. Each reference angular position is detectable based on the characteristic or property of the metamaterial at a specific position along the track.

The characteristic or property of the metamaterial at a specific position along the track results in an angle-dependent behavior or interaction with an mm-wave, where the angle-dependent behavior or interaction is an angle-dependent reflection, angle-dependent absorption, angle-dependent transmission, or an angle-dependent combination thereof.

A receiver circuit may receive and demodulate a receive signal, and evaluate an amplitude modulation and/or a phase modulation of the receive signal using amplitude analysis and/or phase analysis, respectively. For example, the receiver circuit may evaluate an amplitude variation or a phase shift of the receive signal. The receive circuit may then determine an absolute angular position of the metamaterial track and/or the rotatable target object based on the determined amplitude modulation or phase modulation. For example, the receiver circuit may refer to a look-up table provided in memory that stores angular positions relative to a specific amplitude modulation or phase modulation.

Thus, either the amplitude or the phase of the received signal or both is analyzed with respect to the same property of the transmitted signal. The metamaterial is a passive structure, it cannot alter the frequency of the signal. However, it can change its own resonance frequency or, better said, the locations of its poles and zeros, which can then influence the reflected or the transmitted signal and be detected in amplitude and phase or in real and imaginary part of the signal. Both combinations describe the possible influence completely. Analyzing the shift of a resonance or a pole or a zero may also be characterized over the frequency with a frequency sweep of the transmit signal, but requires a more complex evaluation circuitry.

As an example for determining an absolute angular position or discrete angular value for a given metamaterial track, metamaterial track 35 may be configured with a 360° periodical pattern such that a single period of characteristic change is encoded around the perimeter of the metamaterial track 35. Transceiver 43 may transmit a continuous mm-wave as a carrier signal that has a constant frequency. The metamaterial track 35 receives the carrier signal and partially reflects or transmits the signal to a corresponding receiver (e.g., back to transceiver 43 or onwards to transceiver 47). The receiver includes a receiver circuit configured to demodulate a received signal from the corresponding metamaterial track. The receiver circuit is configured to determine a phase and/or an amplitude of the received signal and compare the determined phase and/or amplitude to the phase and/or amplitude of the carrier signal, respectively, to derive the absolute angular position of the corresponding metamaterial track. A certain change in phase or amplitude relative to the carrier signal (i.e., a phase shift or an amplitude shift) can correspond to the absolute angular position of the corresponding metamaterial track.

In addition, a phase shift between two receive signals may be analyzed for determining an absolute angular position. For example, the patterns of metamaterial tracks 33 and 34 may be the same but shifted 90° (e.g., clockwise or counterclockwise) from each other such that there is a 90° phase shift in the extracted signals resultant from the two metamaterial tracks after the evaluation of the metamaterial property. This means that two metamaterial tracks at the same corresponding angle of rotation would produce extracted signals that are 90° out of phase from each other. This essentially produces a sine measurement signal and a cosine measurement signal while the rotatable target object is rotating, that when compared to each other identifies a unique angular position. In this case, the patterns of the metamaterial tracks 33 and 34 form a pair of tracks that have the same number of periods 360°/N periodical pattern encoded thereon, where N is greater than one.

Alternatively, the patterns of metamaterial tracks 33 and 34 may be shifted from each other about the rotational axis, but not necessarily by 90°. Nevertheless, both have a 360°/N periodical pattern that results in their electro-magnetic receive signals being phase shifted 90° from each other. The 90° phase shift or phase difference may be caused by a combination of the relative shift in the patterns around the track and the type of characteristic change and/or metamaterial property used for the tracks.

Similarly, metamaterial tracks 35 and 36 form a pair of tracks that have the same number of periods 360°/M periodical pattern encoded thereon, where M is greater than zero and is a different integer than N. The periodical patterns of metamaterial tracks 35 and 36 may also be shifted about the rotational axis with respect to each other such that there is a 90° phase shift in the extracted signals resultant from the two metamaterial tracks after the evaluation of the metamaterial property. This essentially produces a sine measurement signal and a cosine measurement signal while the rotatable target object is rotating, that when compared to each other identifies a unique angular position The 360°/N and 360°/M periodical patterns provide two pairs of tracks with different angular resolutions. A lower angular resolution may be used during high rotational speeds and a higher angular resolution may be used during low rotational speeds. Thus, a processor of a receiver circuit (e.g., a DSP) may be configured to use at least one of the first, second, third, and fourth mm-wave metamaterial tracks to measure a rotational speed of the rotatable target object, and selectively process receive signals from either the first and second the mm-wave metamaterial tracks 33 and 34 or the third and fourth the mm-wave metamaterial tracks 35 and 36 based on the measured rotational speed for measuring at least one rotational parameter of the rotatable target object. A speed threshold may be used to determine to use the receive signals from tracks 33 and 34 when the rotational speed is less than the speed threshold and to use the receive signals from tracks 35 and 36 when the rotational speed is equal to or greater than the speed threshold.

Analyzing a receive signal from a single track may be used to determine the angular position (i.e., an angular value) of the rotatable target object, if the track has a single period encoded thereon. From this, the rotational speed may also be calculated by determining a rate of change in the angular values.

For tracks that have multiple periods encoded thereon, the rotational speed may be calculated by determining a rate of characteristic change of the receive signal or counting the number of signal periods over time.

Additionally, by obtaining two measurement signals (e.g., two 90° phase shifted signals from a pair of tracks), a rotation direction of the rotatable target object may also be determined.

For example, the rotation direction may be determined at each zero-crossing or at some other switching threshold of a first measurement signal (e.g., a sine measurement signal or a cosine measurement signal). For example, a DSP may determine whether the first measurement signal has a zero-crossing on a falling edge or on a rising edge, and may further analyze the correlation to a negative value or positive value of a second measurement signal (e.g., the other one of the sine measurement signal and the cosine measurement signal).

For example, a negative value of the second measurement signal at a falling edge of the first measurement signal may indicate a first rotation direction. A positive value of the second measurement signal at a rising edge of the first measurement signal may also indicate the first rotation direction. A positive value of the second measurement signal at a falling edge of the first measurement signal may indicate a second rotation direction. A negative value of the second measurement signal at a rising edge of the first measurement signal may also indicate the second rotation direction. Since the second measurement signal is 90° phase shifted to the first measurement signal, the determination of rotation direction is less susceptible to error that may be cause by external stray fields, biasing noise, and other types of interference.

In addition, or in the alternative, the DSP may evaluate the sign of the second measurement signal at each zero crossing of the first measurement signal. If the sign of the second measurement signal alternates between two successive zero crossings (+− or −+), the rotation direction remains the same. However, if the sign of the second measurement signal between two successive zero crossings does not alternate, (++ or −−) a direction change is detected by the DSP.

Alternatively, in cases where sine and cosine are available for the calculation of the angle, the rotation direction is self-evident depending on increase or decrease of the angle value without using a switching threshold.

The wide range of flavors that metamaterials offer with different structures, layers, and mutual coupling could be evaluated based on a complete measurement of the parameters using a frequency modulated signal over the range in which the spectral relevant effects of the metamaterial appear. However, the target applications will provide a low cost measurement compared to a traditional radar. Thus, the circuit effort may be minimized and the RX/TX setup will depend on the final metamaterial design.

Figure 3C:
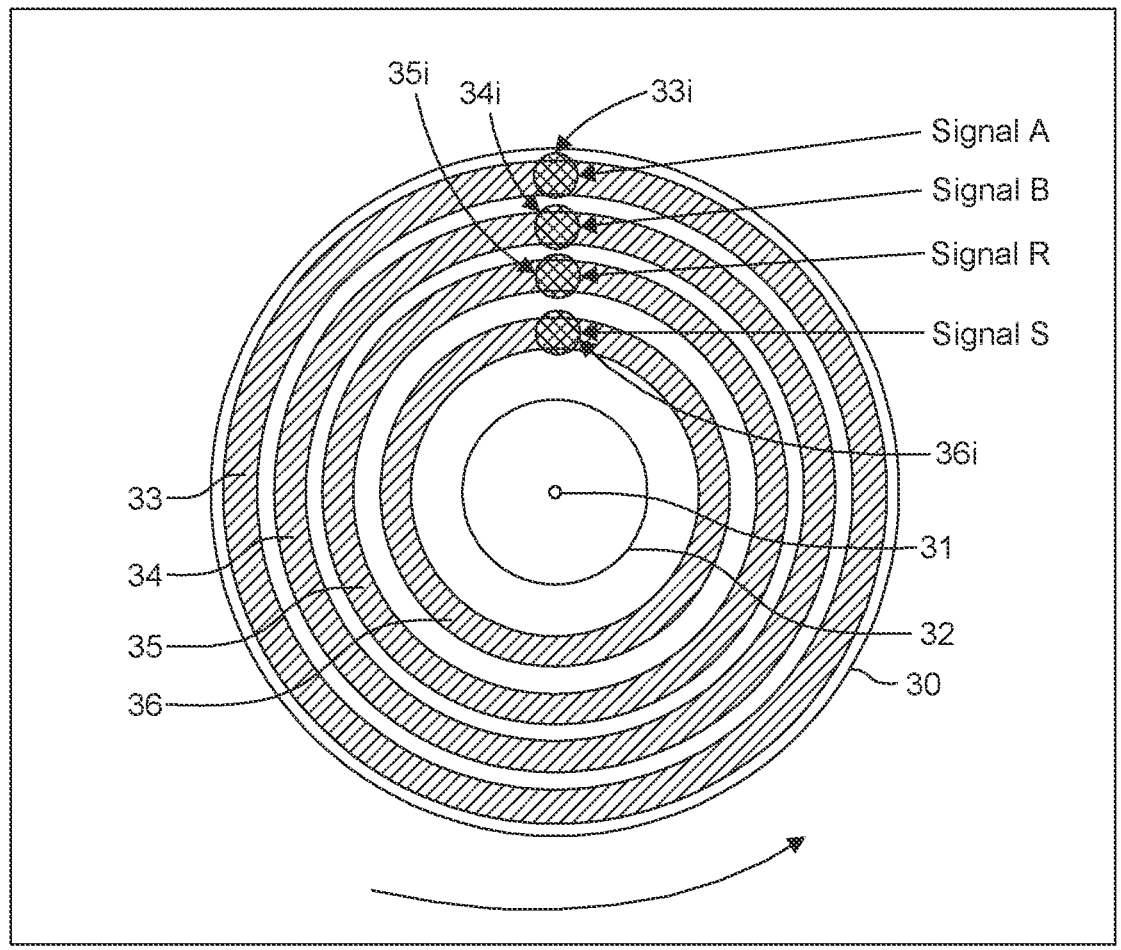
FIG. 3C is a cross-sectional view of the rotational sensor systems shown in FIGS. 3A and 3B.

FIG. 3C is a cross-sectional view of the rotational sensor systems 300A and 300B shown in FIGS. 3A and 3B. FIG. 3C shows the concentric metamaterial tracks 33-36 arranged on the rotatable target object 30 that is coupled to the shaft 32. In addition, illuminated segments 33$i$, 34$i$, 35$i$, and 36$i$ of each track are shown, each segment being an area that is illuminated by a respective transmitter (e.g., transceivers 41-44). The illuminated segments 33$i$-36$i$ are linearly arranged along a radial direction of the rotatable target object 30. The transceivers 41-44 are fixed. Thus, as the rotatable target object 30 rotates, the portion of each metamaterial track that is illuminated by the mm-wave beam changes with the rotation. The receive signals A, B, R, and S are reflected by the illuminated segments 33$i$-36$i$ of their respective track. Accordingly, the phase and/or an amplitude of each receive signal A, B, R, and S changes according to the characteristic change of its metamaterial track.

Figure 4:
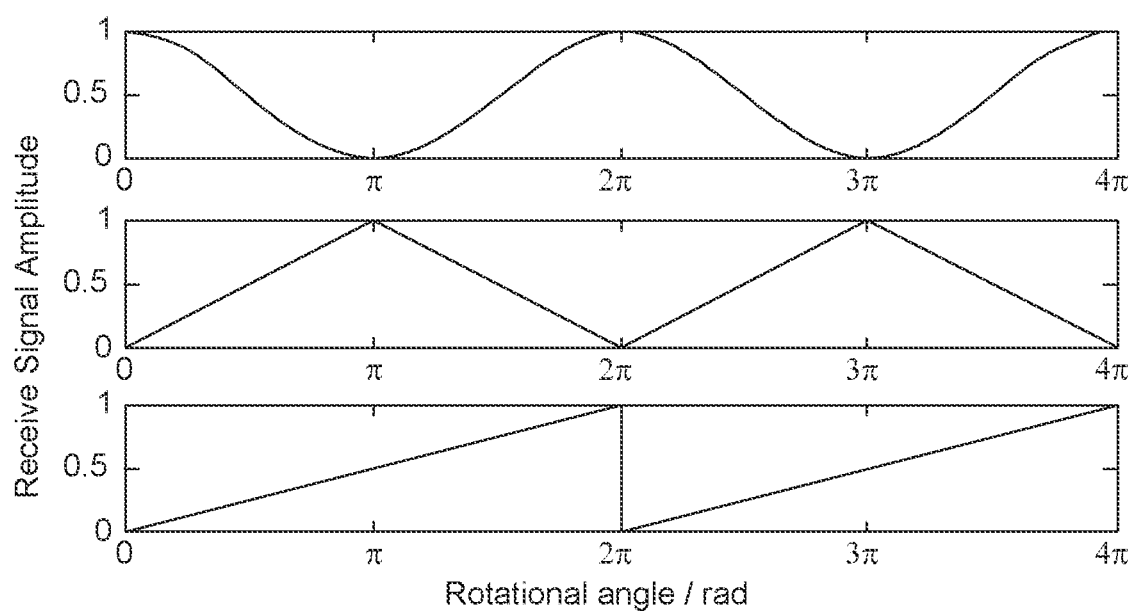
FIG. 4 illustrates possible signal modulations for an electro-magnetic receive signal according to one or more embodiments.

FIG. 4 illustrates possible signal modulations for an electro-magnetic receive signal according to one or more embodiments. Particularly, the amplitude of the receive signal is modulated by one of the metamaterial tracks having a 360° periodical pattern such that a single period of characteristic change is encoded around a respective track perimeter of the metamaterial track. The amplitude of the receive signal has an absolute angular encoding that repeats every 360° of rotation. For example, such signal modulations may correspond to signal R based on the periodical pattern of metamaterial track 35. Signal S may have a same waveform as signal R, but phase shifted 90° with respect to signal R. Signals A and B may also have one of these waveforms, but may instead may have multiple periods encoded for every 360° of rotation, with signals A and B having a 90° phase difference with respect to each other.

Receiver circuitry may specifically select signal A or B to calculate a rotational speed of the rotatable target object 30, select signals A and B or signals R and S to calculate a rotational direction of the rotatable target object 30, and select signal R or S to calculate the absolute angular position of the rotatable target object 30. In this way, one or more rotational parameters of the of the rotatable target object 30 can be determined.

Figure 5:
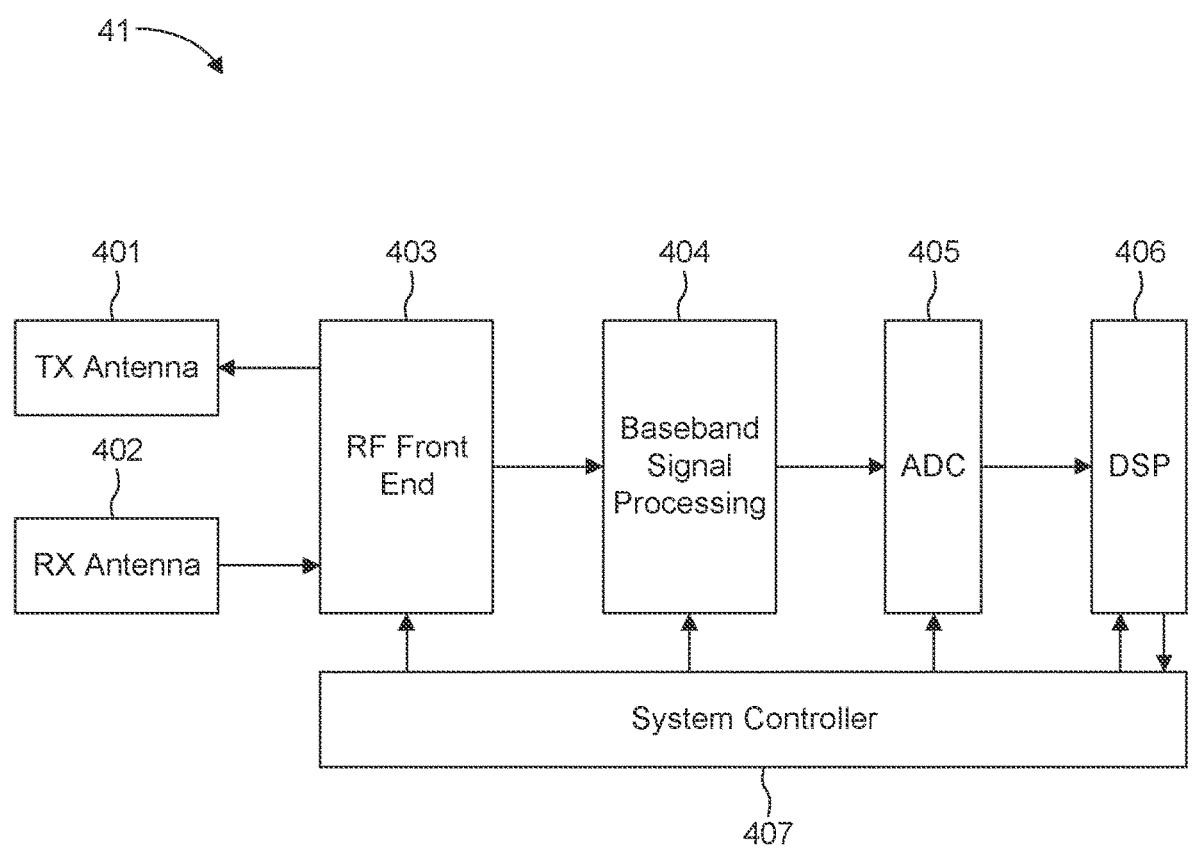
FIG. 5 is a block diagram that illustrates structure of one example of a transceiver according to one or more embodiments.

FIG. 5 is a block diagram that illustrates structure of one example of a transceiver according to one or more embodiments. The transceiver 41 includes relevant transmission circuitry and receiver circuitry to the embodiments described herein. It will also be appreciated that relevant transmission circuitry and receiver circuitry may be divided between the transmitter 41 and receiver 44 according to implementation.

Frequency modulation may be used on the transmitter side to characterize the transfer function of the transmission channel including the metamaterial over frequency. However, a continuous carrier wave with a constant frequency may also be used.

On the measurement side (receiver side), it would still be magnitude (amplitude) and phase or I and Q, which would be the most sophisticated and flexible solution. However, with respect to cost, a system with a constant frequency carrier may be preferable. In this case, the frequency is chosen to be in a defined region with respect to the poles and zeros where the phase or amplitude transfer function has a monotonous behavior with respect to the modified property of the metamaterial. Then a local measurement of phase shift or amplitude attenuation is used.

Accordingly, at least one transmission antenna 401 (TX antenna) and at least one receiver antenna 402 (RX antenna) are connected to an RF front end 403 integrated into a chip, which the RF front end may contain all those circuit components that are required for RF signal processing. These circuit components comprise for example a local oscillator (LO), RF power amplifiers, low noise amplifiers (LNA), directional couplers (for example rat-race couplers, circulators, etc.), and mixers for downmixing (or down-converting) the RF signals into baseband or an intermediate frequency band (IF band). The RF front end 403 may—possibly together with further circuit components—be integrated into a chip, which is usually referred to as a monolithic microwave integrated circuit (MMIC).

The example illustrated shows a bistatic (or pseudo-monostatic) radar system with separate RX and TX antennas. In the case of a monostatic radar system, a single antenna would be used both to emit and to receive the electromagnetic (radar) signals. In this case, a directional coupler (for example a circulator) may be used to separate the RF signals to be emitted from the received RF signals (radar echo signals). Radar systems in practice usually have a plurality of transmission and reception channels (TX/RX channels) with a plurality of TX and RX antennas, which makes it possible, inter alia, to measure the direction (DoA) from which the radar echoes are received. In such multiple-input multiple-output (MIMO) systems, the individual TX channels and RX channels in each case usually have an identical or similar structure.

In the case of a frequency modulated continuous wave (FMCW) radar system, the RF signals emitted by the TX antenna 401 may be for example in the range of approximately 10 GHz to 500 GHz. However, the frequency bands that are applied here depend on the structures to be used for the generation of the metamaterial target. As mentioned, the RF signal received by the RX antenna 402 comprises the radar echoes (chirp echo signals), that is to say those signal components that are backscattered at one or at a plurality of radar targets. The received RF signal is downmixed for example into baseband (or an IF band) and processed further in baseband by way of analog signal processing (see analog baseband signal processing chain 404). The analog signal processing circuitry 404 essentially comprises filtering and possibly amplifying the baseband signal. The baseband signal is finally digitized (see analog-to-digital converter 405) and processed further in the digital domain. The digital signal processing chain may be implemented at least partly in the form of software that is able to be executed on a processor, for example a microcontroller, a digital signal processor (DSP) 406, or another computer unit. The overall system is generally controlled by way of a system controller 407 that may likewise be implemented at least partly in the form of software that is able to be executed on a processor, such as for example a microcontroller. The RF front end 403 and the analog baseband signal processing chain 404 (optionally also the analog-to-digital converter 405) may be integrated together in a single MMIC (that is to say an RF semiconductor chip). As an alternative, the individual components may also be distributed over a plurality of integrated circuits. A single DSP may receive respective digital receive signals from each of the receive antennas for calculating rotational parameters of the rotatable target object 30.

The DSP 406 is configured to perform the aforementioned phase analysis, amplitude analysis, and/or frequency analysis to determine a rotational parameter (e.g., rotational speed, rotational direction, or absolute angular position) of the metamaterial track and/or the rotatable target object based on the determined amplitude modulation and/or phase modulation. The phase modulation of a received signal may be a phase shift of the received signal with respect to a phase of the transmitted mm-wave (i.e., of the carrier signal). Similarly, the amplitude modulation of a received signal may be an amplitude shift of the received signal with respect to an amplitude of the transmitted mm-wave.

The DSP 406 may be configured to determine a phase shift and/or an amplitude shift of a received signal and translate the shift into a rotational parameter either directly from a single receive signal or in combination with another receive signal (e.g., two phase shifted receive signals are used to determine rotational direction). For example, the DSP 406 may refer to a look-up table provided in memory that stores angular positions or values relative to a specific amplitude modulation and/or phase modulation when the track has a 360° periodical pattern.

In addition, the DSP 406 may analyze a phase shift between two receive signals for determining an absolute angular position as described herein. The DSP 406 may also calculate the rotational speed by analyzing the rate of change in the angular values. Additionally, by obtaining two measurement signals (e.g., two 90° phase shifted signals), a rotation direction of the rotatable target object may also be determined by the DSP 406. In general, two receive signals can be used to achieve a 360° unambiguous measurement range. For a system measuring in a limited range the property of the metamaterial must not necessarily be changed according to a sine/cosine system. For a limited range (e.g. +/−60°), a sine alone would be sufficient.

In summary, the structures or their arrangement in the array of elementary structures of which a metamaterial track is comprised is varied around the rotational axis and changes at least one of the mm-wave properties of the arrangement dependent on the rotational angel of the actual position. The mm-wave property can be for example the reflectivity, the transitivity, the polarization, or the phase shift of the receive signal (i.e., the partially-reflected or the partially-transmitted wave). Typically, modifications by the metamaterial will affect multiple of those mm-wave parameters simultaneously.

The target object may be rotational symmetric to the axis like a disc, a ring, cylinder, a sphere, or any other structure that rotates about a rotational axis and enables the metamaterial track to be formed in a closed loop. For example, the rotatable target object may be a wheel, a rim of a wheel, a gear, a shaft, etc.

A mm-wave is radiated onto the rotatable target object and is reflected at its surface or transmitted through it, and is received by a receiver. Depending on the frequency and the distance between the antenna, there can be a far field coupling or a near field coupling. Reflectivity and transmissivity measurements can be combined. The relation of the transmitted and received signals is evaluated with respect to the properties of the metamaterial that is modified dependent on the rotation angle. Since multiple of the metamaterial properties are changing simultaneously, also multiple mm-wave parameters of the received signals will depend on the rotational angle. Two or more mm-wave parameters of a same receive signal or of different receive signals may be evaluated simultaneously to discriminate the rotational position. Similarly, a single parameter of two or more receive signals may also be evaluated to discriminate the rotational position. Consequently, a measurement of all relevant variations can be used to improve the unambiguousness of the angle determination.

There are diverse possibilities for changing a metamaterial property according to a 360°, 360°/N, or 360°/M periodical pattern. It will also be appreciated that a rotational segment of less than 360° may also be applicable. For example, applications that measure limited angle ranges (e.g. throttle valve, chassis level, gas pedal) may also be used. In these cases, the target pattern need not be 360° periodic and can simply change the pattern from a minimum value to a maximum value over the used angle range (e.g., 45°, 60°, 90°, 180° etc.). It naturally follows that the target object also does not need to be a complete disc and can be reduced to a segment.

The following different variations may be used to change the behavior of metamaterial along a rotation direction. Thus, in addition to FIGS. 2A-2C, FIGS. 6A-6G show different arrangements or patterns of elementary structures of a metamaterial according to one or more embodiments.

Figure 6A:
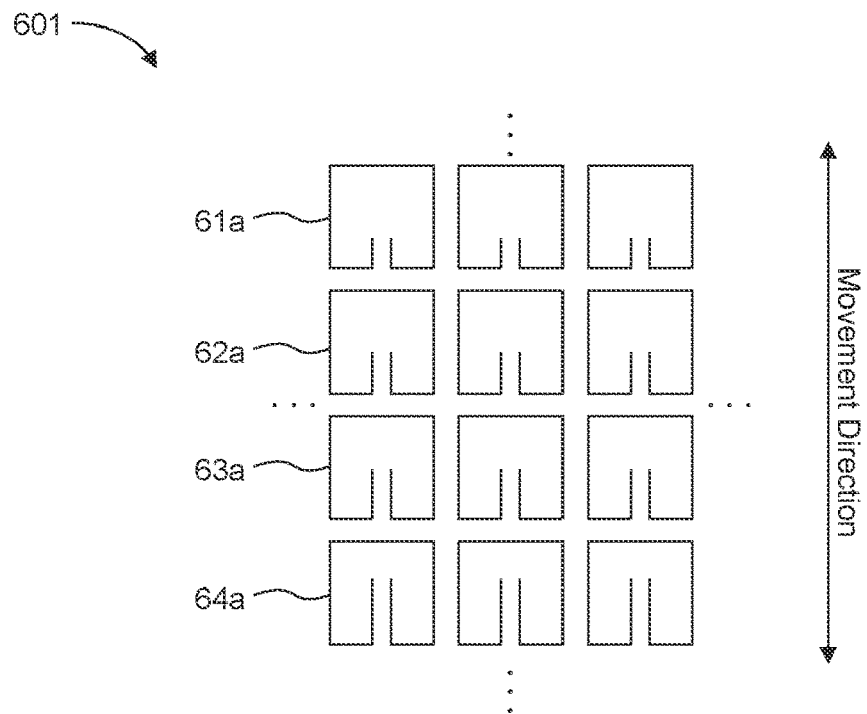
FIGS. 6A-6G show different arrangements or patterns of elementary structures of a metamaterial according to one or more embodiments.

FIG. 6A is a schematic diagram of an array of elementary structures 601 of a metamaterial track according to one or more embodiments. Here, the array includes multiple rows of split ring resonators 61a-64a in which the structures in each row have a same configuration and orientation. However, the structures in different rows have different configurations.

A 360°, 360°/N, or 360°/M periodical pattern may be used to change the coupling capacitance of the split ring resonators along the rotation direction. For example, the coupling capacitance may be increased (or decreased) in the direction of rotation. Here, this is achieved by increasing (or decreasing) the length of the lines inside the opening of the split ring resonator, which results in a gradual and continuous increase (or decrease) in coupling capacitance in the rotation direction. This change in coupling capacitance along the rotation direction (i.e., along the perimeter of the metamaterial track) shifts the resonance frequency such that the change in the phase shift or the amplitude of the receive signal with respect to the transmit signal can be measured. Each phase shift value or amplitude value may be specific to an absolute angular position (i.e., an angular value) of the rotatable target object when the pattern is 360° periodic. Each phase shift value or amplitude value may be specific to an angular value within a 360°/N or 360°/M period but not determinative to an absolute angular position (i.e., an angular value) of the rotatable target object over 360° when multiple periods are encoded (i.e., when N or M is greater than one) in one rotation. For example, a same phase shift or amplitude value may occur at 180° and 360° when N=2.

Figure 6B:
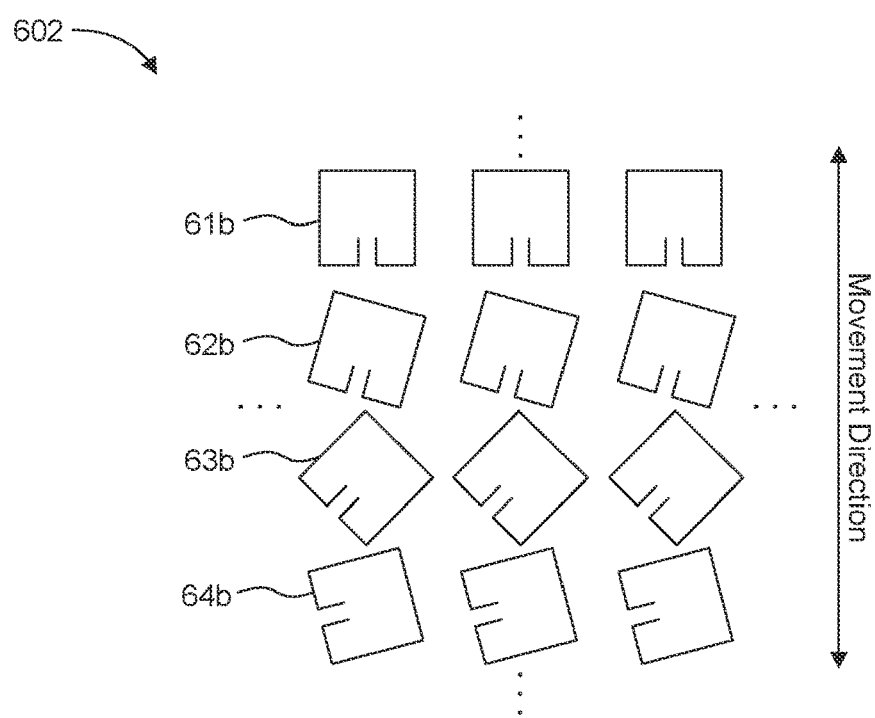

FIG. 6B is a schematic diagram of an array of elementary structures 602 of a metamaterial track according to one or more embodiments. Here, the array includes multiple rows of split ring resonators 61b-64b in which the structures in each row have a same configuration and orientation. However, the structures in different rows have different orientations.

Thus, on the surface of the target object, the split ring resonators 61b-64b are rotated or pivoted (e.g., clockwise or counterclockwise) incrementally in varying degrees along the rotation direction. As a result, the structures in each row have a different angled or radial orientation (i.e., an orientation with respect to the radial vector) with respect to structures in neighboring rows, resulting in a gradual and continuous increase (or decrease) in coupling capacitance in the rotation direction. This makes the metamaterial sensitive to a polarization of the mm-wave, and, specifically changes the sensitivity to the electrical field component of the transmitted wave that changes along the rotation direction. Here, an influence on the polarization is realized since the direction of the dominant E Field in the gap is changing. Thus, a shift in polarization may be measured that is specific to the absolute angular position (i.e., an angular value) of the rotatable target object.

Figure 6C:
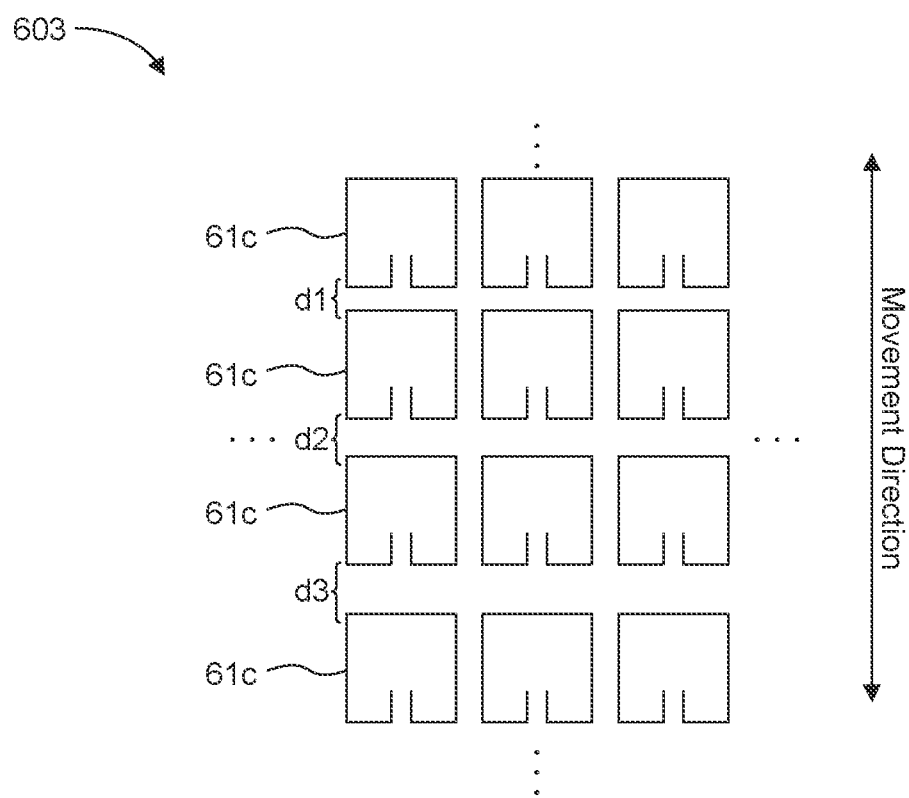

FIG. 6C is a schematic diagram of an array of elementary structures 603 of a metamaterial track according to one or more embodiments. Here, the array includes multiple rows of split ring resonators 61c in which the structures in throughout the array have a same configuration and orientation.

Here, the mutual capacitive coupling of the structures is gradually and continuously changed in the rotation direction by increasing or decreasing the distances d1, d2, d3, and so on between structures along the rotation direction. Thus, rows at the top are closer together than the rows at the bottom of the array. This scales the capacitance between structures in way that is periodical over 360°, 360°/N, or 360°/M.

Figure 6D:
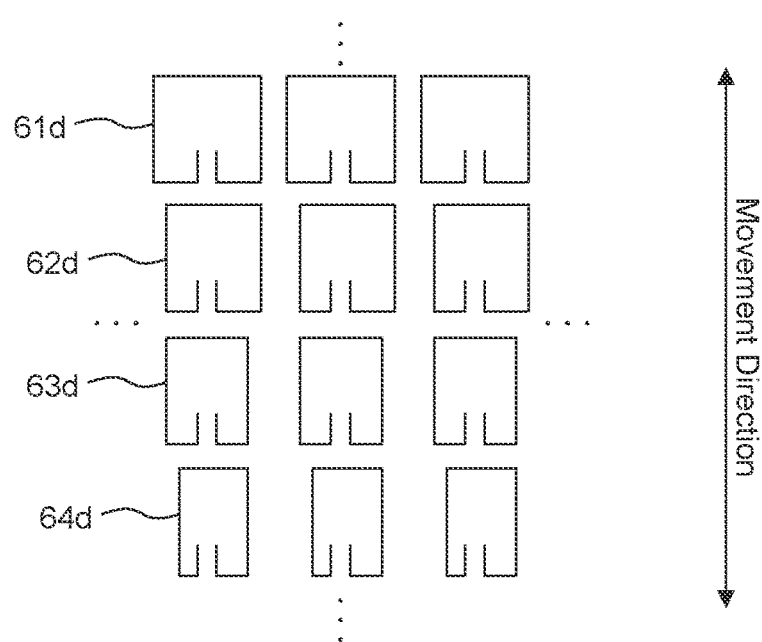

FIG. 6D is a schematic diagram of an array of elementary structures 604 of a metamaterial track according to one or more embodiments. Here, the array includes multiple rows of split ring resonators 61d-64d in which the structures in each row have a same configuration and orientation. However, the structures in different rows have different configurations.

In this case, an inductive coupling scaled by reducing or increasing the loop area in along the rotation direction. For example, the loop size of consecutive rows gradually changes along the rotation direction. Thus, the loop size of the split ring resonators 61d is larger than the loop size of the split ring resonators 62d, which is larger than the loop size of the split ring resonators 63d, and so on. This also results in a change in the spacing between structures in the direction perpendicular to the rotation direction, which may further change the capacitive coupling. This scales the inductive coupling and/or the capacitive coupling between structures in way that is periodical over 360°, 360°/N, or 360°/M.

Figure 6E:
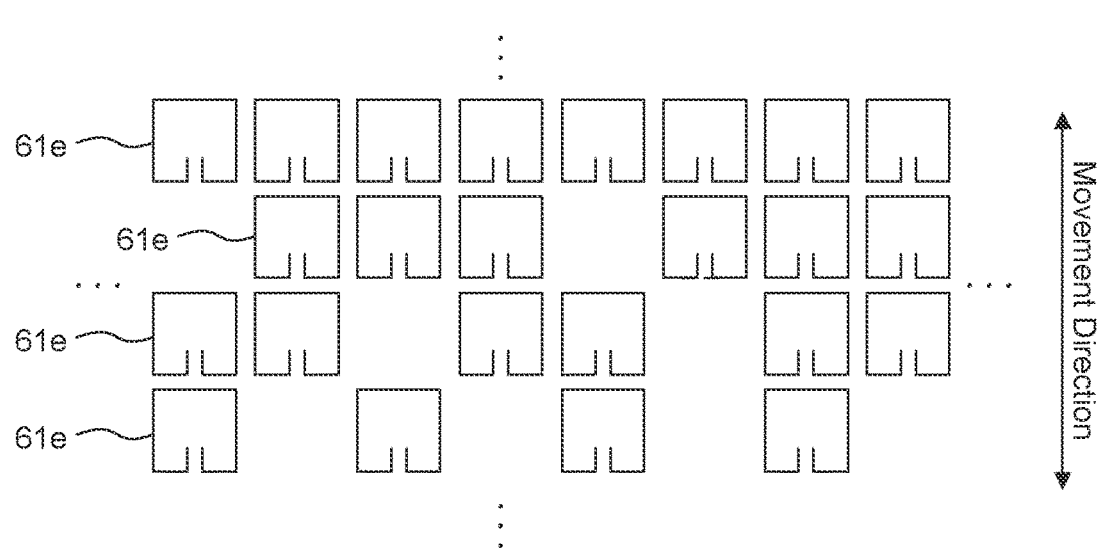

FIG. 6E is a schematic diagram of an array of elementary structures 605 of a metamaterial track according to one or more embodiments. Here, the array includes multiple rows of split ring resonators 61e in which the structures in throughout the array have a same configuration and orientation. However, the density of the structures is changed in the rotation direction by gradually and continuously increasing or decreasing the density of the structures along the rotation direction.

For example, each successive row of structures may be populated more densely or less densely than a preceding row of structures. For example, every position in a first row may be occupied by a structure making up a first (full) density of structures in that row. In a second row, less than every position is occupied by a structure making up a second density of structures in that row that is less dense than the first density. In a third row, less than every position is occupied by a structure making up a third density of structures in that row that is less dense than the second density, and so on. This scales the inductive coupling and/or the capacitive coupling between structures in way that is periodical over 360°, 360°/N, or 360°/M.

Figure 6F:
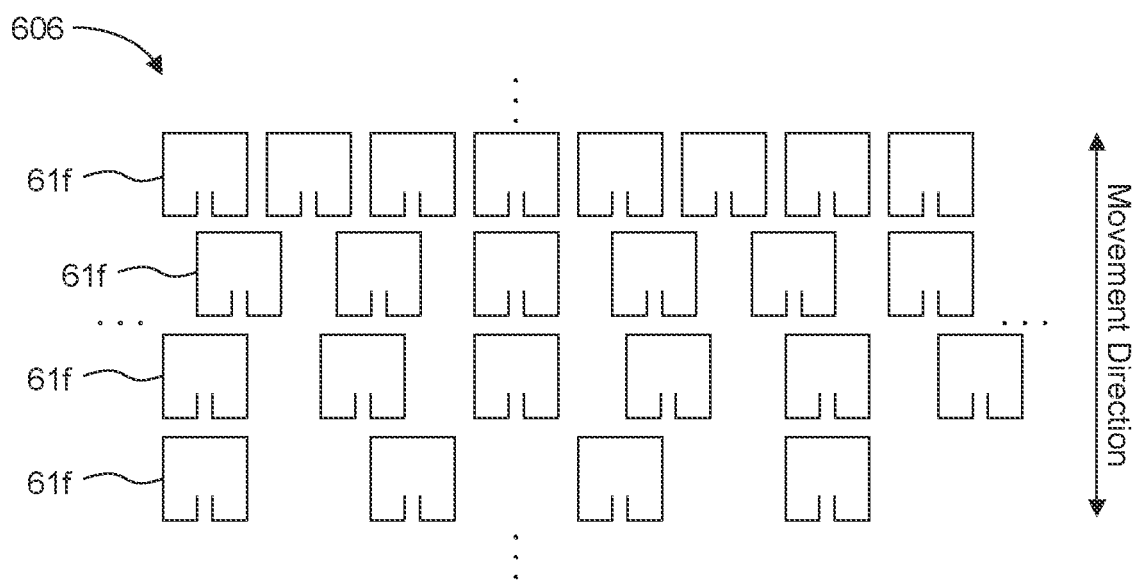

FIG. 6F is a schematic diagram of an array of elementary structures 606 of a metamaterial track according to one or more embodiments. Here, the array includes multiple rows of split ring resonators 61f in which the structures in throughout the array have a same configuration and orientation. However, the density of the structures is changed in the rotation direction by gradually and continuously increasing or decreasing the density of the structures along the rotation direction.

In this example, a lateral distance between structures in each successive row may be changed in the rotation direction by increasing or decreasing the spacing between structures along the rotation direction. For example, every position in a first row may be occupied by a structure making up a first (full) density of structures in that row. In a second row, the spacing between adjacent structures is increased in comparison to the spacing between adjacent structures in the first row, making up a second density of structures in that row that is less dense than the first density. In a third row, the spacing between adjacent structures is increased in comparison to the spacing between adjacent structures in the second row, making up a third density of structures in that row that is less dense than the second density, and so on.

Figure 6G:
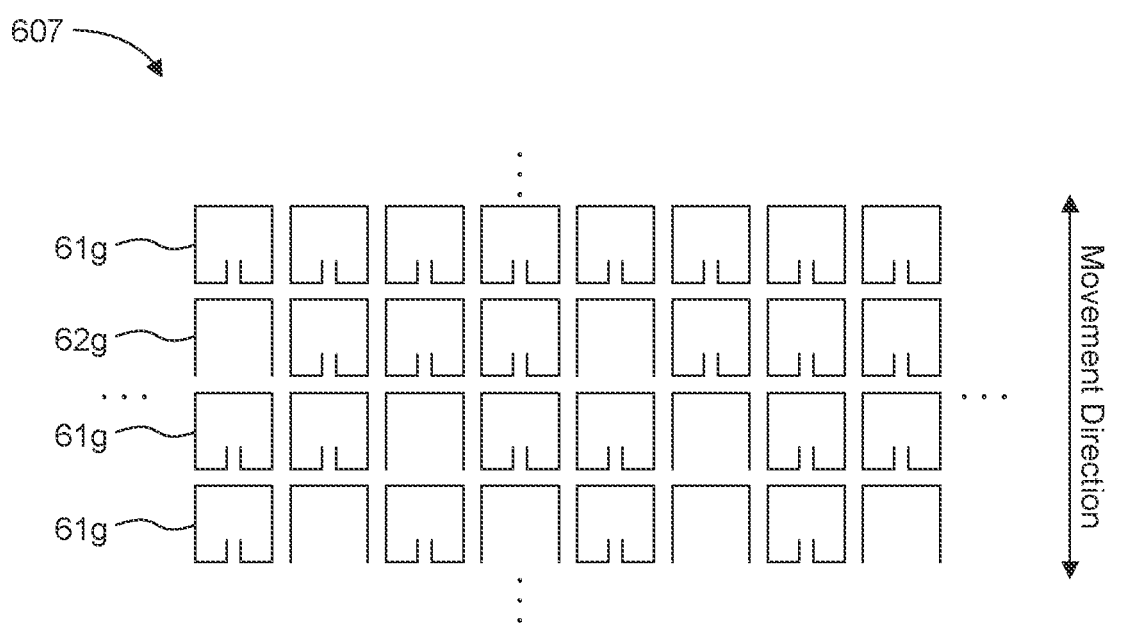

FIG. 6G is a schematic diagram of an array of elementary structures 607 of a metamaterial track according to one or more embodiments. Here, the array is a heterogeneous array of mixed different structures such that the structure types that populate the array is varied in different arrangements throughout the array. In this case, two different types of structures 61g and 62g are use in a pattern that gradually and continuously changes the inductive coupling and/or the capacitive coupling between structures in way that is periodical over 360°, 360°/N, or 360°/M. It will be appreciated that two or more types of structures may also be used to form the heterogeneous array.

In view of the above examples, scaling of a metamaterial property is done with a pattern of structures that repeats or changes completely and continuously around the circumference of the rotatable target or along the perimeter of the metamaterial track such that a change in reflectivity and/or transmittivity follows a 360°, 360°/N, or 360°/M periodical pattern where the reflectivity and/or transmittivity is unique for each discrete angle when the pattern is 360° periodic.

Figure 7A:
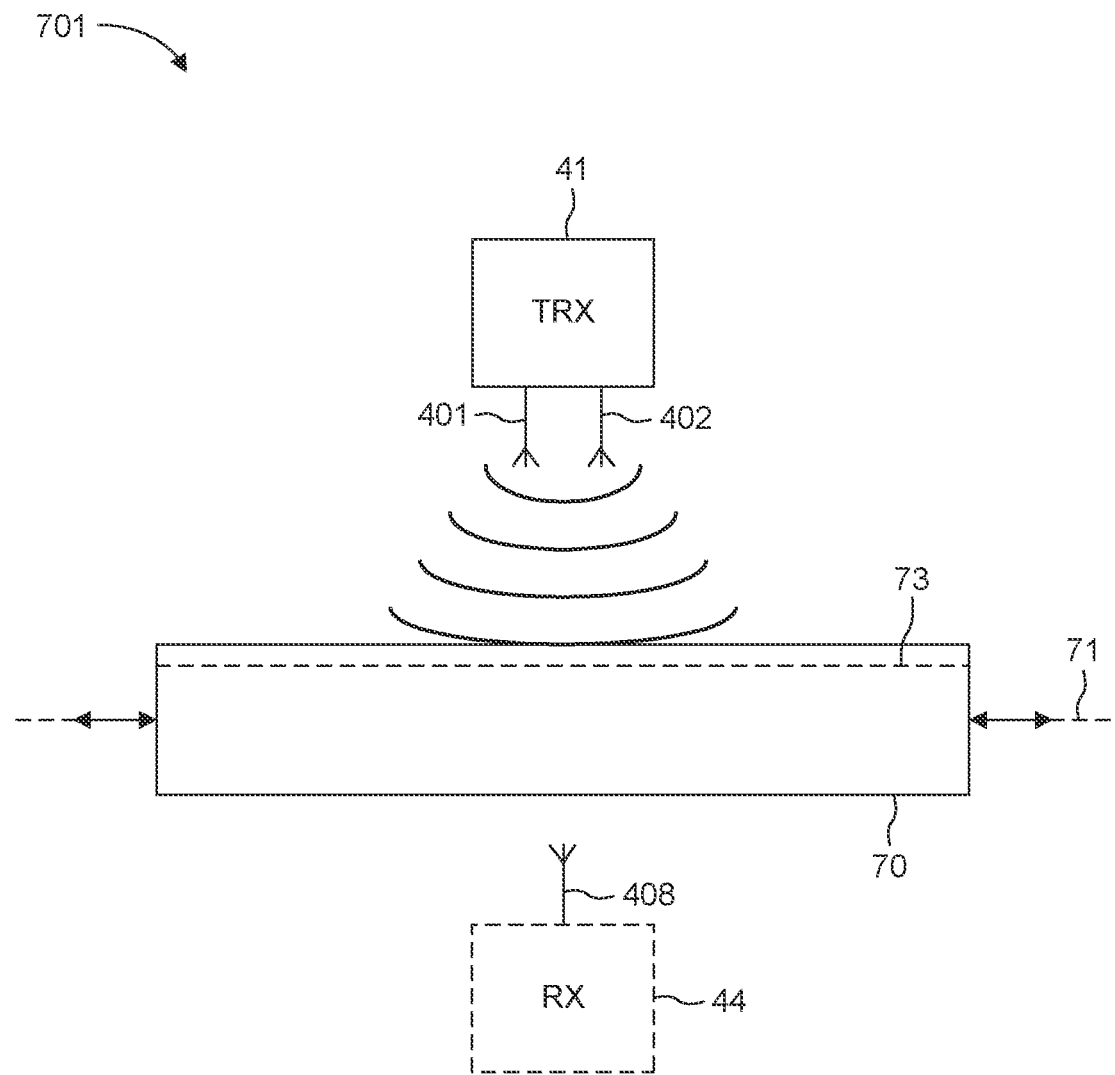
FIGS. 7A and 7B illustrate a cross-section view and a plan view, respectively, of a linear position sensor system according to one or more embodiments.
Figure 7B:
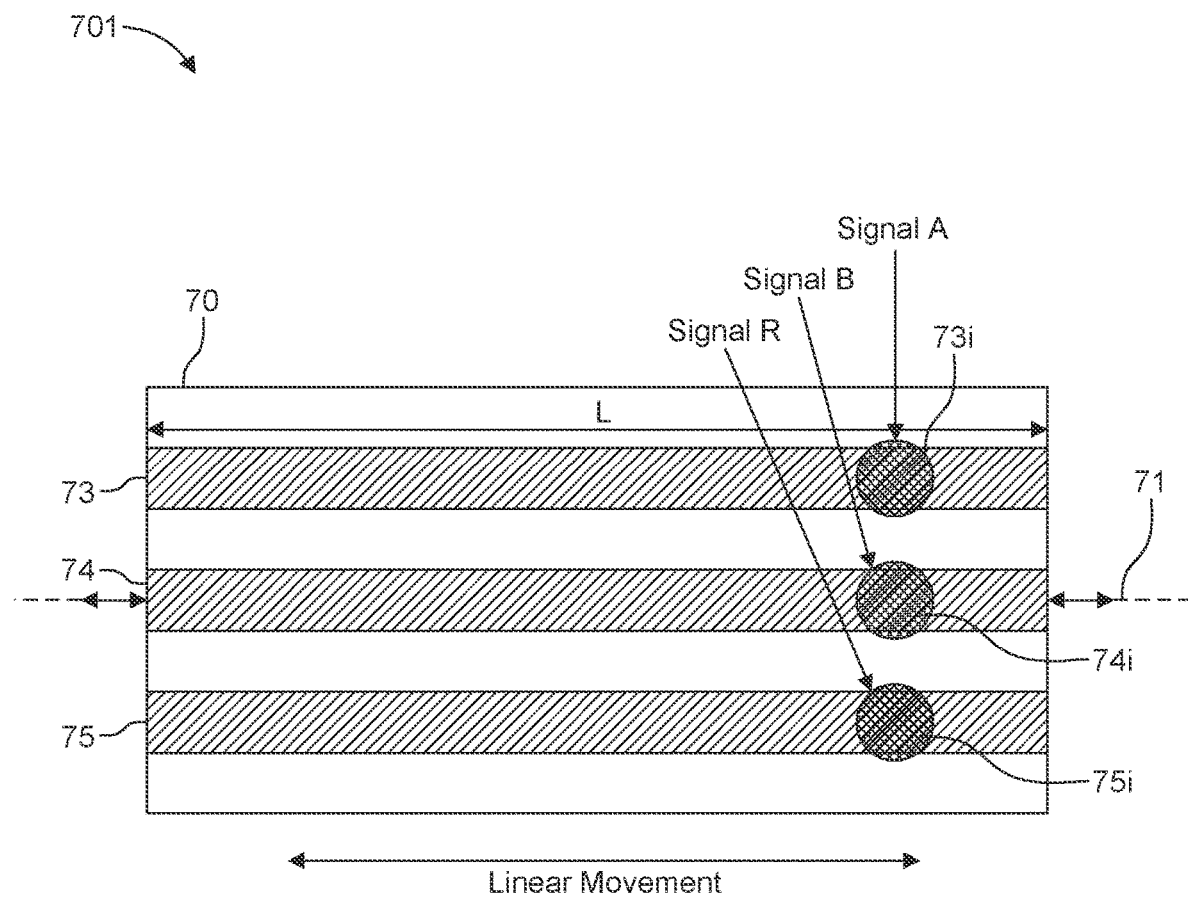

Similar principles described above also apply to a linear position sensor system. In particular, FIGS. 7A and 7B illustrate a cross-section view and a plan view, respectively, of a linear position sensor system 701 according to one or more embodiments. In this case, a linear movable target object 70 configured to move linearly in a linear moving direction on a linear axis 71. Three mm-wave metamaterial tracks 73-75 are coupled to the linear movable target object 70 such that the mm-wave metamaterial tracks 73-75 each extend lengthwise along the linear moving direction.

The mm-wave metamaterial track 73 is made up of a first array of elementary structures having at least one first characteristic that changes along the mm-wave metamaterial track in the linear moving direction, similar to the way the configuration of the array of elementary structures changes around the perimeter of the mm-wave metamaterial track in the previous examples related to rotational position sensing. The elementary structures of mm-wave metamaterial track 73 may, for example, have an L/N periodical pattern where the characteristic change repeats N times over the length L of the mm-wave metamaterial track. N may be an integer equal to or greater than one. The length L of the mm-wave metamaterial track 73 may also equal the length of the linear movable target object 70 or a range of linear motion that the linear movable target object 70 undergoes. The mm-wave metamaterial track 73 generates a receive signal A (e.g., a reflection signal) when an mm-wave beam is incident thereon at the illuminated segment 73i of the track. The receive signal A has an oscillating waveform, for example, similar to those waveforms shown in FIG. 4, with the number of signal periods over length L dependent on N.

The mm-wave metamaterial track 74 is made up of a second array of elementary structures having at least one second characteristic that changes along the mm-wave metamaterial track in the linear moving direction, similar to the way the configuration of the array of elementary structures changes around the perimeter of the mm-wave metamaterial track in the previous examples related to rotational position sensing. The elementary structures of mm-wave metamaterial track 74 may, for example, have an L/N periodical pattern where the characteristic change repeats N times over the length L of the mm-wave metamaterial track. N may be an integer equal to or greater than one. The mm-wave metamaterial track 74 generates a receive signal B (e.g., a reflection signal) when an mm-wave beam is incident thereon at the illuminated segment 74i of the track. The periodical pattern of mm-wave metamaterial track 74 may be linearly shifted in the linear moving direction relative to the periodical pattern of mm-wave metamaterial track 73 such that receive signal B is shifted 90° with respect to receive signal A.

The mm-wave metamaterial track 75 is made up of a third array of elementary structures having at least one second characteristic that changes along the mm-wave metamaterial track in the linear moving direction, similar to the way the configuration of the array of elementary structures changes around the perimeter of the mm-wave metamaterial track in the previous examples related to rotational position sensing. The elementary structures of mm-wave metamaterial track 75 may, for example, have a single periodical pattern that extends the length L of the mm-wave metamaterial track such that the reflectivity and/or transmittivity of the track is unique for each discrete linear position. Thus, the configuration of the array of elementary structures is unique to a linear position of the mm-wave metamaterial track on the linear movable target object 70.

The mm-wave metamaterial track 75 generates a receive signal R (e.g., a reflection signal) when an mm-wave beam is incident thereon at the illuminated segment 75i of the track. Because only a signal period of characteristic change is encoded onto track 75, the phase shift and/or amplitude shift of the receive signal R is unique to the absolute linear position of the linear movable target object 70.

The linear position sensor system 701 further includes at least one of a transceiver, transmitter, and/or receiver combination. For example, the linear position sensor system 701 may include a transceiver 41 having a transmitter antenna 401 configured to transmit an mm-wave (i.e., an electro-magnetic transmit signal) at the metamaterial track 73. The transceiver 41 also includes a receiver antenna 402 configured to receive a partially-reflected mm-wave (i.e., an electro-magnetic receive signal A) from the metamaterial track 73.

Alternatively, the linear position sensor system 701 may include receiver 44 that includes receiver antenna 408 that is configured to receive a partially transmitted mm-wave (i.e., an electro-magnetic receive signal A) as a result of the transmitted mm-wave interacting with (i.e., being partially absorbed by and transmitted through) the metamaterial track 73. Additional transceivers, transmitters, and/or receivers are used for transmitting to and receiving from the other metamaterial tracks 74 and 75 in a similar manner discussed above in reference to FIGS. 3A and 3B.

The receiver circuitry (e.g., DSP 406) either at transceiver 41 or at receiver 44 is configured to receive the electro-magnetic receive signal A and determine a linear speed of the linear movable target object 70 based on the received electro-magnetic signal A. In particular, the mm-wave metamaterial track 73 is configured to modify the electro-magnetic transmit signal, thereby producing the electro-magnetic receive signal A having a property unique to the linear position of the mm-wave metamaterial track at which the electro-magnetic transmit signal is incident, and at least one processor is configured to evaluate the property of the received electro-magnetic receive signal A, and determine the linear speed of the linear movable target object based on the evaluated property.

The receiver circuitry (e.g., DSP 406) either at transceiver 42 or at receiver 46 is configured to receive the electro-magnetic receive signal B and determine a linear movement direction of the linear movable target object 70 based on the received electro-magnetic signals A and B and, more particularly, based on the positive or negative phase shift thereof.

The receiver circuitry (e.g., DSP 406) either at transceiver 43 or at receiver 47 is configured to receive the electro-magnetic receive signal R and determine an absolute linear position of the linear movable target object 70 based on the received electro-magnetic signal R according to a unique phase shift and/or amplitude shift that corresponds to the linear position of the linear movable target object 70.

Figure 8A:
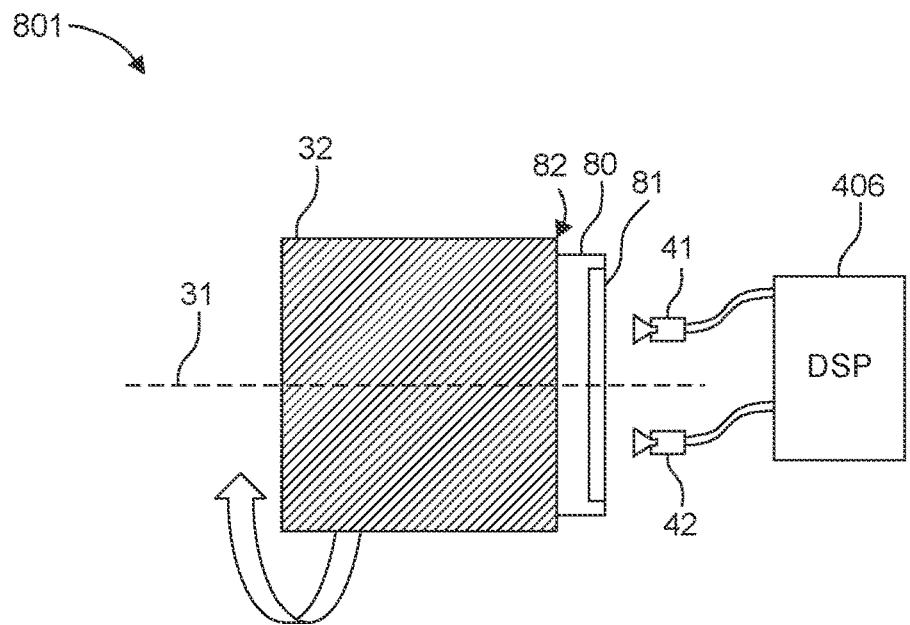
FIGS. 8A and 8B illustrate a schematic views of an end-of-shaft rotary sensor system according to one or more embodiments.
Figure 8B:
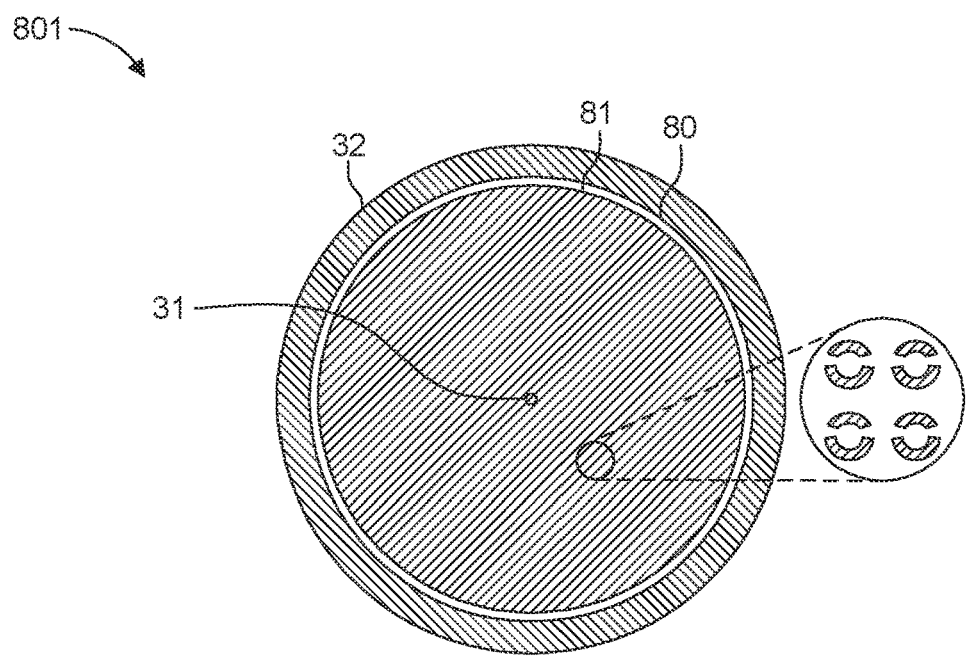

Similar principles described above also apply to an end-of-shaft sensor system for rotary speed, direction, and position measurements. In particular, FIGS. 8A and 8B illustrate schematic views of an end-of-shaft rotary sensor system 801 according to one or more embodiments. FIG. 8A is a side view and FIG. 8B is an end-facing view of a shaft 32. A mm-metamaterial array 81 is arranged on a rotatable target object 80 that is mounted on an end 82 of the shaft 32. The mm-metamaterial array 81 may be a circle or disc-shaped array of elementary structures that is concentric with respect to the rotation axis 31.

The end-of-shaft rotary sensor system 801 includes two transceivers 41 and 42 that target different segments of the mm-metamaterial array 81 with respective mm-beams (i.e., electro-magnetic transmit signals). In particular, the two transceivers 41 and 42 are arranged at different radial distances from the rotation axis 31 and, therefore, target different concentric tracks within the mm-metamaterial array 81. Both concentric tracks may have one or more periods of characteristic change encoded thereon.

Both transceivers 41 and 42 receive respective electro-magnetic transmit signals that have been modulated by the elementary structures of the array 81 and are processed by receiver circuitry. Using similar principles described above, the receiver circuitry may compare the two receive signals to each other to identify a unique angular position (i.e., an absolute angular position) of the rotatable target object 80 or shaft 32 as well as the rotational direction via analyzing the phase shift or difference in amplitude or difference in resonance frequency therebetween (i.e., whether the phase shift is positive or negative or the difference between the amplitudes is positive or negative or the difference in resonance frequency is positive or negative). In addition, the receiver circuitry may use one of the receive signals to determine the rotational speed, as described above.

If one of the concentric tracks has a 360° periodical pattern such that a single period of characteristic change is encoded around the respective track perimeter of the track, the receiver circuit may also compare the phase and/or amplitude of the receive signal to the phase and/or amplitude of the transmitted carrier signal to derive the absolute angular position of the corresponding metamaterial track. A certain change in phase or amplitude relative to the carrier signal (i.e., a phase shift or an amplitude shift) can correspond to the absolute angular position of the corresponding metamaterial track.

To simplify the comparison, both tracks may have the same number of periods encoded thereon, with a single period providing the most flexibility in calculating rotational speed, direction, and absolute angular position using two transceivers.

It will also be appreciated that additional transceivers may be added to generated additional receive signals (e.g., three or more receive signals) that can be processed in any manner described herein for calculating rotational speed, direction, and absolute angular position.

Figure 9A:
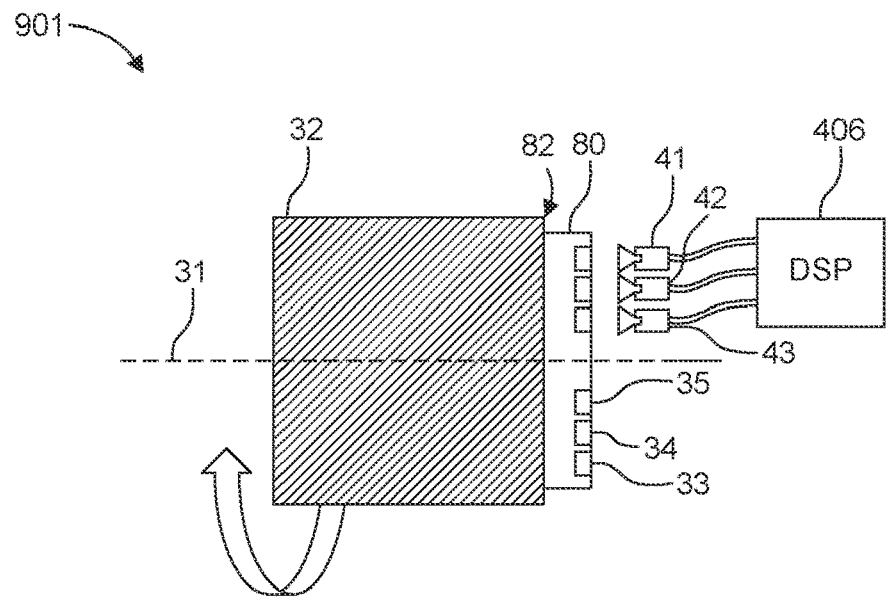
FIGS. 9A and 9B illustrate a schematic views of another end-of-shaft rotary sensor system according to one or more embodiments.
Figure 9B:
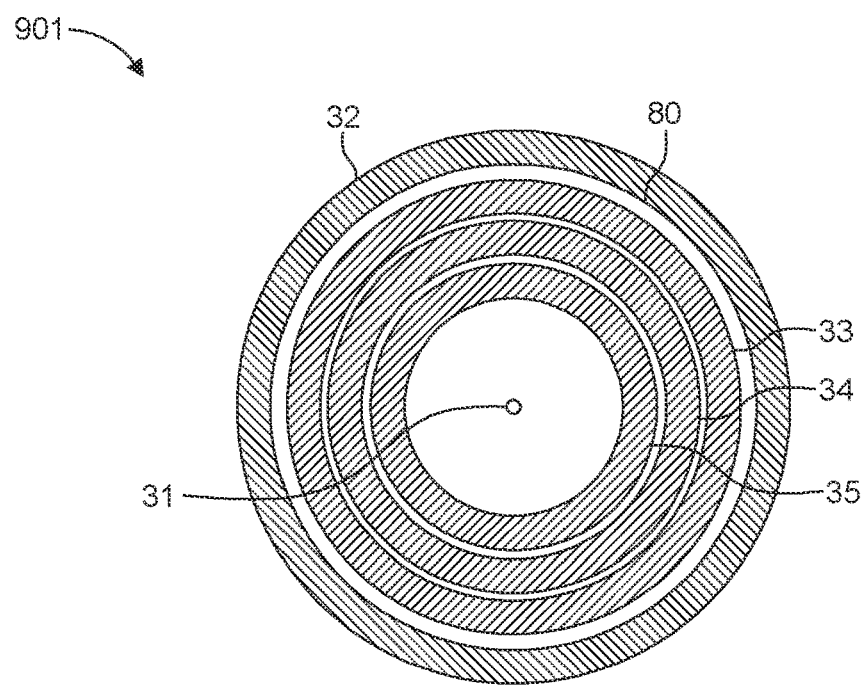

FIGS. 9A and 9B illustrate a schematic views of an end-of-shaft rotary sensor system 901 according to one or more embodiments. FIG. 9A is a side view and FIG. 9B is an end-facing view of a shaft 32. The end-of-shaft rotary sensor system 901 uses three separate metamaterial tracks 33, 34, and 35, as similarly described in reference to FIGS. 3A-3C, with the exception that the metamaterial tracks 33, 34, and 35 are arranged at the end 82 of the shaft 32. Thus, similar principles apply here as were previously set forth above.

It will also be appreciated that additional transceivers may be added to generate additional receive signals (e.g., four or more receive signals) that can be processed in any manner described herein for calculating rotational speed, direction, and absolute angular position.

According to a method of determining at least one rotational parameter of a rotatable target object, the method includes transmitting a first electro-magnetic transmit signal towards a first millimeter-wave (mm-wave) metamaterial track, the first mm-wave metamaterial track being coupled to the rotatable target object, wherein the first mm-wave metamaterial track is arranged in a closed loop around a rotational axis about which the rotatable target object rotates; transmitting a second electro-magnetic transmit signal towards a second mm-wave metamaterial track, the second mm-wave metamaterial track being coupled to the rotatable target object, wherein the second mm-wave metamaterial track is arranged in a closed loop around the rotational axis; transmitting a third electro-magnetic transmit signal towards a third mm-wave metamaterial track, the third mm-wave metamaterial track being coupled to the rotatable target object, wherein the third mm-wave metamaterial track is arranged in a closed loop around the rotational axis; converting, by the first mm-wave metamaterial track, the first electro-magnetic transmit signal into a first electro-magnetic receive signal; converting, by the second mm-wave metamaterial track, the second electro-magnetic transmit signal into a second electro-magnetic receive signal; converting, by the third mm-wave metamaterial track, the third electro-magnetic transmit signal into a third electro-magnetic receive signal; evaluating, by at least one processor, the first, the second, and the third electro-magnetic receive signals; determining, by the at least one processor, a rotational speed of the rotatable target object based on the first electro-magnetic receive signal; determining, by the at least one processor, a rotational direction of the rotatable target object based on the first and the second electro-magnetic receive signals; and determining, by the at least one processor, an absolute angular position of the rotatable target object based on the third electro-magnetic receive signal.

In addition, in the method, the first mm-wave metamaterial track comprises a first array of elementary structures having a 360°/N periodical pattern that changes gradually around the perimeter of the first mm-wave metamaterial track, wherein N is an integer greater than one such that such that N periods of characteristic change is encoded around the perimeter of the first mm-wave metamaterial track, the second mm-wave metamaterial track comprises a second array of elementary structures having the 360°/N periodical pattern that changes continuously around the perimeter of the second mm-wave metamaterial track such that N periods of characteristic change is encoded around the perimeter of the second mm-wave metamaterial track, the third mm-wave metamaterial track comprises a third array of elementary structures having a 360° periodical pattern that changes continuously around the perimeter of the third mm-wave metamaterial track such that a single period of characteristic change is encoded around the perimeter of the third mm-wave metamaterial track, and the 360°/N periodical pattern of the second array of elementary structures is rotated about the rotational axis with respect to the 360°/N periodical pattern of the first array of elementary structures such that the first electro-magnetic receive signal and the second electro-magnetic receive signal have a 90° phase difference.

Further, while various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A rotation sensor system, comprising:
 a rotatable target object configured to rotate about a rotational axis in a rotation direction;
 a first millimeter-wave (mm-wave) metamaterial track coupled to the rotatable target object, wherein the first mm-wave metamaterial track is arranged around the rotational axis, and wherein the first mm-wave metamaterial track comprises a first array of elementary structures having at least one first characteristic that changes around a perimeter of the first mm-wave metamaterial track;
 a second mm-wave metamaterial track coupled to the rotatable target object, wherein the second mm-wave metamaterial track is arranged around the rotational axis, and wherein the second mm-wave metamaterial track comprises a second array of elementary structures having at least one second characteristic that changes around a perimeter of the second mm-wave metamaterial track; and
 a third mm-wave metamaterial track coupled to the rotatable target object, wherein the third mm-wave metamaterial track is arranged around the rotational axis, and wherein the third mm-wave metamaterial track comprises a third array of elementary structures having at least one third characteristic that changes around a perimeter of the third mm-wave metamaterial track.

2. The rotation sensor system of claim 1, further comprising:
 a fourth mm-wave metamaterial track coupled to the rotatable target object, wherein the fourth mm-wave metamaterial track is arranged around the rotational axis, and wherein the fourth mm-wave metamaterial track comprises a fourth array of elementary structures having at least one fourth characteristic that changes around a perimeter of the fourth mm-wave metamaterial track; and
 at least one processor configured to use at least one of the first mm-wave metamaterial track, the second mm-wave metamaterial track, the third mm-wave metamaterial track, and the fourth mm-wave metamaterial track to measure a rotational speed of the rotatable target object, and selectively process receive signals from either the first mm-wave metamaterial track and the second mm-wave metamaterial track or the third mm-wave metamaterial track and fourth the mm-wave metamaterial track based on the measured rotational speed for measuring at least one rotational parameter of the rotatable target object.

3. The rotation sensor system of claim 2, wherein:
the first array of elementary structures has a first 360°/N periodical pattern that changes continuously around the perimeter of the first mm-wave metamaterial track, wherein N is an integer greater than one such that N periods of characteristic change are encoded around the perimeter of the first mm-wave metamaterial track,
the second array of elementary structures has a second 360°/N periodical pattern that changes continuously around the perimeter of the second mm-wave metamaterial track such that N periods of characteristic change are encoded around the perimeter of the second mm-wave metamaterial track, and
the second 360°/N periodical pattern is shifted with respect to the first 360°/N periodical pattern.

4. The rotation sensor system of claim 3, wherein:
the third array of elementary structures has a first 360°/M periodical pattern that changes continuously around the perimeter of the third mm-wave metamaterial track, wherein M is an integer greater than zero such that one or more periods of characteristic change are encoded around the perimeter of the third mm-wave metamaterial track, wherein M and N are different integers,
the fourth array of elementary structures has a second 360°/M periodical pattern that changes continuously around the perimeter of the fourth mm-wave metamaterial track such that one or more periods of characteristic change are encoded around the perimeter of the fourth mm-wave metamaterial track, and
the second 360°/M periodical pattern is shifted with respect to the first 360°/M periodical pattern.

5. The rotation sensor system of claim 1, wherein the first mm-wave metamaterial track, the second mm-wave metamaterial track, and the third mm-wave metamaterial track are concentric with each other and the rotational axis.

6. The rotation sensor system of claim 1, wherein:
the first array of elementary structures has a 360°/N periodical pattern that changes continuously around the perimeter of the first mm-wave metamaterial track, wherein N is an integer greater than one such that N periods of characteristic change are encoded around the perimeter of the first mm-wave metamaterial track,
the second array of elementary structures has the 360°/N periodical pattern that changes continuously around the perimeter of the second mm-wave metamaterial track such that N periods of characteristic change are encoded around the perimeter of the second mm-wave metamaterial track, and
the third array of elementary structures has a 360° periodical pattern that changes continuously around the perimeter of the third mm-wave metamaterial track such that a single period of characteristic change is encoded around the perimeter of the third mm-wave metamaterial track.

7. The rotation sensor system of claim 6, wherein:
the 360°/N periodical pattern of the second array of elementary structures is rotated about the rotational axis with respect to the 360°/N periodical pattern of the first array of elementary structures such that electro-magnetic receive signals from the first mm-wave metamaterial track and the second mm-wave metamaterial track have a 90° phase difference.

8. The rotation sensor system of claim 1, wherein:
each of the first array of elementary structures, the second array of elementary structures, and the third array of elementary structures have a 360° periodical pattern that changes continuously around a respective track perimeter such that a single period of characteristic change is encoded around the respective track perimeter of each of the first mm-wave metamaterial track, the second mm-wave metamaterial track, and the third mm-wave metamaterial track.

9. The rotation sensor system of claim 8, wherein:
the 360° periodical pattern of the second array of elementary structures is rotated about the rotational axis with respect to the 360° periodical pattern of the first array of elementary structures such that electro-magnetic receive signals from the first mm-wave metamaterial track and the second mm-wave metamaterial track have a 90° phase difference.

10. The rotation sensor system of claim 1, further comprising:
at least one transmitter configured to transmit a first electro-magnetic transmit signal towards the first mm-wave metamaterial track, a second electro-magnetic transmit signal towards the second mm-wave metamaterial track, and a third electro-magnetic transmit signal towards the third mm-wave metamaterial track,
wherein the first mm-wave metamaterial track is configured to convert the first electro-magnetic transmit signal into a first electro-magnetic receive signal, the second mm-wave metamaterial track is configured to convert the second electro-magnetic transmit signal into a second electro-magnetic receive signal, and the third mm-wave metamaterial track is configured to convert the third electro-magnetic transmit signal into a third electro-magnetic receive signal;
at least one receiver configured to receive the first electro-magnetic receive signal, the second electro-magnetic receive signal, and the third electro-magnetic receive signal; and
at least one processor configured to determine a rotational speed of the rotatable target object based on the first electro-magnetic receive signal, determine a rotational direction of the rotatable target object based on the first electro-magnetic receive signal and the second electro-magnetic receive signal, and determine an absolute angular position of the rotatable target object based on the third electro-magnetic receive signal.

11. The rotation sensor system of claim 10, wherein:
the first mm-wave metamaterial track is configured to modify the first electro-magnetic transmit signal, thereby producing the first electro-magnetic receive signal having a first property that corresponds to a first illuminated segment of the first mm-wave metamaterial track at which the first electro-magnetic transmit signal is incident,
the second mm-wave metamaterial track is configured to modify the second electro-magnetic transmit signal, thereby producing the second electro-magnetic receive signal having a second property that corresponds to a second illuminated segment of the second mm-wave metamaterial track at which the second electro-magnetic transmit signal is incident,
the third mm-wave metamaterial track is configured to modify the third electro-magnetic transmit signal, thereby producing the third electro-magnetic receive signal having a third property unique to a third illuminated segment of the third mm-wave metamaterial track at which the third electro-magnetic transmit signal is incident, and the first illuminated segment, the second illuminated segment, and the third illuminated segment are linearly arranged along a radial direction of the rotatable target object.

12. The rotation sensor system of claim 1, further comprising:
a shaft coupled to the rotatable target object, the shaft extending along the rotational axis,
wherein the first mm-wave metamaterial track, the second mm-wave metamaterial track, and the third mm-wave metamaterial track each form a respective closed loop around the shaft.

13. A method of determining at least one rotational position of a rotatable target object, the method comprising:
transmitting a first electro-magnetic transmit signal towards a first millimeter-wave (mm-wave) metamaterial track, the first mm-wave metamaterial track being coupled to the rotatable target object, wherein the first mm-wave metamaterial track is arranged in a closed loop around a rotational axis about which the rotatable target object rotates;
transmitting a second electro-magnetic transmit signal towards a second mm-wave metamaterial track, the second mm-wave metamaterial track being coupled to the rotatable target object, wherein the second mm-wave metamaterial track is arranged in a closed loop around the rotational axis;
transmitting a third electro-magnetic transmit signal towards a third mm-wave metamaterial track, the third mm-wave metamaterial track being coupled to the rotatable target object, wherein the third mm-wave metamaterial track is arranged in a closed loop around the rotational axis;
converting, by the first mm-wave metamaterial track, the first electro-magnetic transmit signal into a first electro-magnetic receive signal;
converting, by the second mm-wave metamaterial track, the second electro-magnetic transmit signal into a second electro-magnetic receive signal;
converting, by the third mm-wave metamaterial track, the third electro-magnetic transmit signal into a third electro-magnetic receive signal;
evaluating, by at least one processor, the first electro-magnetic receive signal, the second electro-magnetic receive signal, and the third electro-magnetic receive signal;
determining, by the at least one processor, a rotational speed of the rotatable target object based on the first electro-magnetic receive signal;
determining, by the at least one processor, a rotational direction of the rotatable target object based on the first and the second electro-magnetic receive signals; and
determining, by the at least one processor, an absolute angular position of the rotatable target object based on the third electro-magnetic receive signal.

14. The method of claim 13, wherein:
the first mm-wave metamaterial track comprises a first array of elementary structures having a 360°/N periodical pattern that changes gradually around a perimeter of the first mm-wave metamaterial track, wherein N is an integer greater than one such that N periods of characteristic change are encoded around the perimeter of the first mm-wave metamaterial track, the second mm-wave metamaterial track comprises a second array of elementary structures having the 360°/N periodical pattern that changes continuously around a perimeter of the second mm-wave metamaterial track such that N periods of characteristic change are encoded around the perimeter of the second mm-wave metamaterial track, and the third mm-wave metamaterial track comprises a third array of elementary structures having a 360° periodical pattern that changes continuously around a perimeter of the third mm-wave metamaterial track such that a single period of characteristic change is encoded around the perimeter of the third mm-wave metamaterial track.

15. The method of claim 14, wherein:
the 360°/N periodical pattern of the second array of elementary structures is rotated 90° about the rotational axis with respect to the 360°/N periodical pattern of the first array of elementary structures such that the first electro-magnetic receive signal and the second electro-magnetic receive signal have a 90° phase difference.

16. A linear position sensor system, comprising:
a linear movable target object configured to move linearly in a linear moving direction;
a first millimeter-wave (mm-wave) metamaterial track coupled to the linear movable target object, wherein the first mm-wave metamaterial track extends lengthwise parallel to the linear moving direction, and wherein the first mm-wave metamaterial track comprises a first array of elementary structures having at least one first characteristic that changes along the first mm-wave metamaterial track in the linear moving direction;
a second mm-wave metamaterial track coupled to the linear movable target object, wherein the second mm-wave metamaterial track extends lengthwise parallel to the linear moving direction, and wherein the second mm-wave metamaterial track comprises a second array of elementary structures having at least one second characteristic that changes along a length of the second mm-wave metamaterial track parallel to the linear moving direction;
a third mm-wave metamaterial track coupled to the linear movable target object, wherein the third mm-wave metamaterial track extends lengthwise parallel to the linear moving direction, and wherein the third mm-wave metamaterial track comprises a third array of elementary structures having at least one third characteristic that changes along a length of the third mm-wave metamaterial track;
at least one transmitter configured to transmit a first electro-magnetic transmit signal towards the first mm-wave metamaterial track, a second electro-magnetic transmit signal towards the second mm-wave metamaterial track, and a third electro-magnetic transmit signal towards the third mm-wave metamaterial track, wherein the first mm-wave metamaterial track is configured to convert the first electro-magnetic transmit signal into a first electro-magnetic receive signal, wherein the second mm-wave metamaterial track is configured to convert the second electro-magnetic transmit signal into a second electro-magnetic receive signal, and wherein the third mm-wave metamaterial track is configured to convert the third electro-magnetic transmit signal into a third electro-magnetic receive signal;

at least one receiver configured to receive the first electro-magnetic receive signal, the second electro-magnetic receive signal, and the third electro-magnetic receive signal; and at least one processor configured to determine a linear speed, a movement direction, and an absolute linear position of the linear movable target object based on the first electro-magnetic receive signal, the second electro-magnetic receive signal, and the third electro-magnetic receive signal.

17. The linear position sensor system of claim 16, wherein:

the first electro-magnetic transmit signal illuminates a first area of the first mm-wave metamaterial track, the second electro-magnetic transmit signal illuminates a second area of the second mm-wave metamaterial track, and the third electro-magnetic transmit signal illuminates a third area of the third mm-wave metamaterial track, and the first area, the second area, and the third area are linearly arranged in a direction perpendicular to the linear moving direction.

18. The linear position sensor system of claim 16, wherein:

the first mm-wave metamaterial track comprises the first array of elementary structures having an L/N periodical pattern that changes gradually along the length of the first mm-wave metamaterial track, wherein L is the length of the first mm-wave metamaterial track and N is an integer greater than one such that N periods of characteristic change are encoded along the length of the first mm-wave metamaterial track, the second mm-wave metamaterial track comprises the second array of elementary structures having an L/N periodical pattern that changes gradually along the length of the second mm-wave metamaterial track, wherein L is the length of the second mm-wave metamaterial track and N is an integer greater than one such that N periods of characteristic change are encoded along the length of the second mm-wave metamaterial track, and the third mm-wave metamaterial track comprises the third array of elementary structures having a single periodical pattern that changes gradually along the length of third mm-wave metamaterial track such that a single period of characteristic change is encoded along the length of the third mm-wave metamaterial track.

19. The linear position sensor system of claim 18, wherein:

the L/N periodical pattern of the second array of elementary structures is linearly shifted with respect to the L/N periodical pattern of the first array of elementary structures such that the first electro-magnetic receive signal and the second electro-magnetic receive signal have a 90° phase difference.

* * * * *